(12) United States Patent
Dubuc

(10) Patent No.: US 6,325,435 B1
(45) Date of Patent: *Dec. 4, 2001

(54) SOLID SURFACE MATERIAL FABRICATION STATION

(76) Inventor: Paul C. Dubuc, 2 Overbrook Dr., Bristol, RI (US) 02809

( * ) Notice: Subject to any disclaimer, the term of this patent is extended or adjusted under 35 U.S.C. 154(b) by 0 days.

This patent is subject to a terminal disclaimer.

(21) Appl. No.: 09/301,589

(22) Filed: Apr. 29, 1999

Related U.S. Application Data

(63) Continuation-in-part of application No. 08/952,446, filed on Nov. 20, 1997, which is a continuation of application No. PCT/US97/12560, filed on Jul. 24, 1996, now Pat. No. 5,791,713, which is a continuation-in-part of application No. 08/686,554, filed on Jul. 26, 1996, now Pat. No. 5,791,713.

(51) Int. Cl.$^7$ ................................ B60P 3/14; B23P 13/04

(52) U.S. Cl. ........................ 296/24.1; 29/557; 52/36.1; 409/182

(58) Field of Search .................... 29/557, 897.32, 29/DIG. 67; 407/54; 409/182; 144/287; 269/17; 296/24.1; 52/36.1, 79.1, 143

(56) References Cited

U.S. PATENT DOCUMENTS

| | | | |
|---|---|---|---|
| 2,636,526 | 4/1953 | Madden | 144/286 |
| 3,525,183 | 8/1970 | Gargrave | 51/270 |
| 3,965,933 | 6/1976 | Beaudin | 137/610 |
| 4,529,343 | 7/1985 | Adams | 409/182 |
| 4,538,995 | 9/1985 | Fryer | 434/432 |
| 4,556,247 | 12/1985 | Mahaffey | 296/24 R |
| 4,570,915 | 2/1986 | O'Hern | 269/295 |
| 4,643,476 | 2/1987 | Montgerard | 296/24 R |
| 4,660,477 | 4/1987 | Kortering et al. | 108/108 |
| 4,768,570 | 9/1988 | Honeyman | 144/145 R |
| 4,814,220 | 3/1989 | Brathwaite | 428/119 |
| 5,063,859 | 11/1991 | Rader | 105/340 |
| 5,120,378 | 6/1992 | Porter et al. | 156/91 |
| 5,137,098 | 8/1992 | Raffaelli | 175/403 |
| 5,314,200 | 5/1994 | Phillips | 280/400 |
| 5,354,592 | 10/1994 | Miskell | 428/115 |
| 5,379,816 | 1/1995 | Charlton | 144/287 |
| 5,402,860 | 4/1995 | Fry | 182/225 |
| 5,507,122 | 4/1996 | Aulson | 52/79.1 |
| 5,791,713 | * 8/1998 | Duboc | 296/24.1 |

FOREIGN PATENT DOCUMENTS

| | | |
|---|---|---|
| 2 730 200 | 8/1996 | (FR) . |
| 813492 | 5/1959 | (GB) . |

* cited by examiner

Primary Examiner—David P. Bryant
(74) Attorney, Agent, or Firm—Michael D. Bednarek; Shaw Pittman LLP

(57) ABSTRACT

A fabrication station (117) suitable for use mobile unit (1) or as stand alone unit for fabricating solid surface construction materials is provided, as is a method of use therefor. The fabrication station is equipped with climate control units (23, 23a, 123) fabrication equipment (24, 124) and other environment control equipment. Therefore, solid surface construction materials can be fabricated onsite or at a remote fabrication shop. In the fabrication process according to the present invention, dimensional information is laid out directly onto the solid surface material stock. The fabrication station can include an adjustable support (124a) that supports each slat support channel portion so that the position of the slat of support channel portions is adjustable relative to the support wall and one another to provide a fine adjustment. The fabrication station can also include removable slat portions 124c to accommodate different shapes of solid surface material to fabricate. The removable slat portion can have an angled upper surface and or include a plurality of spaced holes, a clamp, a hook or a longitudinal groove. The base (110) from which the support wall (102) extends can have wheels (110W) to make the unit mobile. The fabrication station can also include a timer switch (123t) for switching the heat supply units (123) on and off independently of other heat supply units and a photoelectric switch (142) for selectively opening and closing the exhaust vents.

43 Claims, 16 Drawing Sheets

SOLID SURFACE MATERIAL FABRICATION STATION

CLAIM TO THE BENEFIT OF RELATED APPLICATIONS

This application is a continuation-in-part of and claims the benefit under 35 U.S.C. §120 of U.S. application Ser. No. 08/952,446 filed Nov. 20, 1997, which application is a §371 of PCT/US97/12560 filed Jul. 24, 1997 which application was a continuation-in-part of U.S. application Ser. No. 08/686,554 filed Jul. 26, 1996 and now U.S. Pat. No. 5,791,713 issued Aug. 11, 1998.

BACKGROUND OF THE INVENTION

1. Field of the Invention

The present invention relates to a solid surface material fabrication station, a mobile fabrication unit for use in fabricating solid surface materials, especially construction materials and a method of fabricating solid surface materials.

2. Description of Related Art

In recent years solid surface construction materials have become increasingly popular, especially for use as a countertop surface. The term "solid surface" construction material refers to a number of different products, such as CORIAN by Dupont, FOUNTAINHEAD, and other synthetic materials as well as solid surface veneer such as NUVEL by Formica and similar products sold by Wilson Art.

The fabrication of such products may be tightly controlled, for example. Dupont, for example, sells CORIAN only to certified fabricators who have fabrication shops that meet certain strict standards set by Dupont.

However, the traditional system and method for fabricating such sheet materials typically takes several days to complete.

First, a crew of people must take the necessary measurements for a particular job, such as measuring out a countertop. This typically involves a process referred to as "templating," namely, using particle board, plywood, cardboard or other disposable material, and creating a template, or a pattern, for cutting the solid surface material stock as required. The template is then taken back to an offsite fabrication shop where the solid surface material is fabricated accordingly. The thus-fabricated solid surface material is then transported back to the worksite and installed. Often, the above-described templating process is relatively inaccurate, so measuring errors and the like occur, and must be compensated for in an additional onsite final fitting process. Because of this, the entire process typically requires more than one week to complete. This is highly problematic from the fabricator's perspective in terms of staffing and work flow. Moreover, from the customer's point of view, the large amount of time and labor required is inconvenient and, indeed, disruptive. For these reasons, it is believed that the conventional fabrication process may restrict, or even discourage, customers from purchasing and installing solid surface construction materials, such as CORIAN.

SUMMARY OF THE INVENTION

It is therefore an object of the present invention to develop a system and method for faster and more efficient fabrication of solid surface materials. This objective is achieved by providing a fabrication station, mobile fabrication system and a fabrication process according to the present invention. The fabrication station can be used as a stand alone unit or as a mobile fabrication system.

The mobile fabrication system of the present invention involves a mobile unit that is either self-propelled (such as a stepvan or panel truck) or adapted to be pulled by a vehicle, such as a trailer pulled by pickup truck or the like. The mobile unit according to the present invention characteristically contains or is otherwise provided with all of the equipment necessary to fabricate solid surface construction materials. To provide a satisfactory work environment the mobile unit must have adequate lighting, ventilation, climate control, power supply and work surfaces. The present inventor has found that in the context of solid surface fabrication there are certain minimum requirements for each of these characteristics.

Fabrication of solid surface materials in a confined area presents several technical challenges. One significant example, is the need to provide adequate ventilation while maintaining climate control, at least in localized areas. More specifically, fabricating solid surface materials entails a great deal of cutting and sanding, which generates significant amounts of dust. This dust must be removed from the work area. On the other hand, solid surface fabrication also requires climate control, particularly in the area where the solid sheet is being fabricated. The fabrication process is hampered if the area around the sheet material is too hot or too cold.

To remove the dust generated from fabrication from the air within the work area, large volumes of air must be moved. But, moving large volumes of air makes it difficult to control temperatures. The present invention addresses these conflicting requirements by providing high volume ventilation and climate control equipment and by locating such equipment to optimize the work environment. Specifically, ventilation equipment is provided in the area above the solid sheet material and climate control equipment is provided in the area below the solid sheet material.

The process according to the present invention involves the unique step of measuring out dimensional information directly onto the solid surface material itself, without an intermediate template as discussed above. This is made possible because the mobile unit can be brought directly to a worksite. Therefore, the solid surface material stock can be brought to the worksite and can be fabricated on location, rather than needing to bring a temporary, and frequently inaccurate, template back to an offsite shop where fabrication is carried out, as in the known art. This increases the accuracy and speed of fabrication.

The present invention also provides an integrated fabrication station designed for use as a stand alone unit or as an integrated part of a mobile fabrication trailer that includes features designed to improve work conditions on discrete sections of the work piece. With this fabrication station design, it is possible to cool the material, sand the material, put the material over, rout it, cut it, everything with all the necessary lighting on a single fabrication station. The fabrication station also provides task lighting, area lighting, ventilation air coming in over the fabricator's head, and spaced exhaust vents sucking the dust out right off of the surface of the work piece. At the same time, the discrete sections of the underside or the entire underside of the surface of the work piece can be heated, since it is known that the adhesive material usually dries quickly with heat.

The improved fabrication station design is well suited for use in a mobile fabrication trailer, but the fabrication station construction of the present invention is useful in other environments since certain conditions apply to all solid surface fabrication. For instance, the processing of the solid surface material with adhesives is speeded up and made easier if the fabricator can control the atmosphere around the solid surface material. It is not practical to heat warehouses or shops to the level needed to expedite drying and, even it were, doing so would create an uncomfortable work environment. Thus, the discrete heating feature of the present invention is highly desirable.

Moreover, it is always desirable to prevent the dust generated during fabrication from interfering with the fabricator's breathing. Likewise, it is desirable to heat and light the material and have the fabricator's tools located near the solid surface material workpiece. Because climate-type conditions (particularly temperature and air quality) can be controlled in discrete regions of the work piece using the fabrication station of the present invention, the fabrication station does not have to be enclosed. There are, however, advantages to operating in a confined space. For example, it is easier to control dust in an enclosed environment like a trailer. Thus, the present invention also relates to a fabrication station construction that is adaptable to both mobile fabrication and use in a factory or workshop environment.

In accordance with one embodiment of the fabrication station that is intended for use in a factory or shop setting, the fabrication stations are stand alone units that include two fabrication work positions arranged back to back. The fabrication stations can also be constructed as fabrication station modules that have a flat back so that the fabrication stations can be arranged in variety of configurations from back-to-back to along an interior or exterior wall to "cubicle" arrangement. The stations may be provided with wheels to facilitate relocation. In another embodiment, the stand alone unit has a fabrication station on one side and storage on the other side. In addition, without the dimensional constraints imposed by designing the fabrication stations for use in a trailer, other designs of fabrication stations become practical. For example, the fabrication station may be lengthened to include storage space as an extension of the fabrication station. In the context of a trailer, however, the fabrication station may be integrated into the structure of the trailer or simply a stand alone unit mounted into a trailer.

The fabrication station preferably includes vertically arranged longitudinally extending continuous chambers or plenums that are hollow to provide forced air passages and also provide routing for all the utilities needed. The utilities and forced air (hot, cold, fresh etc) can be generated by known devices proximate the fabrication station or supplied from known remote sources depending on the environment in which the fabrication station is used. The top of the chambers can be used as a shelf and the bottom side can be used to support task lighting that is illuminating the surface of the work piece. The lower chambers are preferable used to support adjustable rods that support slat support channel of the slat support. All the utilities (e.g., compressed air for pneumatic tools, vacuum supply, fuel for heat exchangers, electrical wiring for the electrical outlets, fans, heaters, lights and coolers) can be provided within the plenum or chambers. The utilities and forced air (hot, cold, fresh etc) can be generated by known devices proximate the fabrication station or supplied from known remote sources depending on the environment in which the fabrication station is used. The hollow chamber is screwed directly into a trailer or fabrication station wall and is preferably a fiberglass component that is very rigid and durable.

The present invention also provides ventilation air intake vents and air exhaust vents for exhausting dust ridden arranged along the fabrication station so as to create a circulating air barrier (air curtain) between the fabricator's face and the surface of solid sheet material that is being worked on. From a fabricator or an employee or worker's vantage point, ventilation air is brought in over the user's head to replace the air that is being drawn through the exhaust vents from the counter top near the fabricator's hands and waistline.

The present invention also provides a table saw assembly that is useful in the context of a mobile trailer. In particular, the table saw assembly is swingably supported for compact storage between spaced fabrication stations, but is easily swung from its storage position to a horizontal ready-to-use position during those rare, but indispensable times during fabrication when the fabricator needs the table saw.

The fabrication station of the present invention preferably includes a bench adjustment rod and bench slat system that eliminates much of the structural steel in fabrication trailers. The station includes a single steel track that runs across the support wall of the fabrication station. The track slidably supports one of the two ends of a plurality of spaced slat support channels so that the spaced slat support channels can slide along the length of the fabrication station, but are maintained in alignment on a common plane that it essentially horizontal. An adjustment rod is provided to further support and maintain the alignment of each of the spaced slat support channels. The adjustment rod is also supported in a track (preferably attached to or formed in the fiberglass hot air plenum or chamber) so that the adjustment rod can slide with the spaced slat support channel that it supports. The adjustment rod allows fine adjustment of the position of the spaced slat support channels. By virtue of this construction, the spaced slat support channels provide a support that is suitably flat at all times.

The fabrication station further includes removable slat portions that are supported by the spaced slat support channels. The removable slat portions may be made of a sacrificial material. In accordance with the present invention, a variety of removable slat portions can be supported within the channels to accommodate different needs. For example, long or short removable slat portions may be used and angled removable slat portions may be used. Removable slat portions that support longitudinal slats may be used to provide a stiff support. Specialized removable slat portions can also be used. For example, the removable slat portions could be provided with a hook clamp to hold certain work pieces. The removable slat portions could include a series of holes running parallel to the top of the slat to allow the user to hook something in the hole and lock the workpiece down. The removable slat system thus offers myriad possibilities for supporting workpieces all with the assurance that the relative levelness in relation to the wall is consistent.

The fabrication station of the present invention also includes switches designed to simplify operation of the various components within the station. The heat supply units are, for example, connected to switches that may be operated on timers. Photo electric switches are provided near other vents so that they can be turned on or off by simply placing a hand near the vent.

These and other objects and novel features of the present invention will become more apparent from the following detailed description, taken in conjunction with the accompanying drawings.

DETAILED DESCRIPTION OF THE PREFERRED EMBODIMENTS

Figure 1:
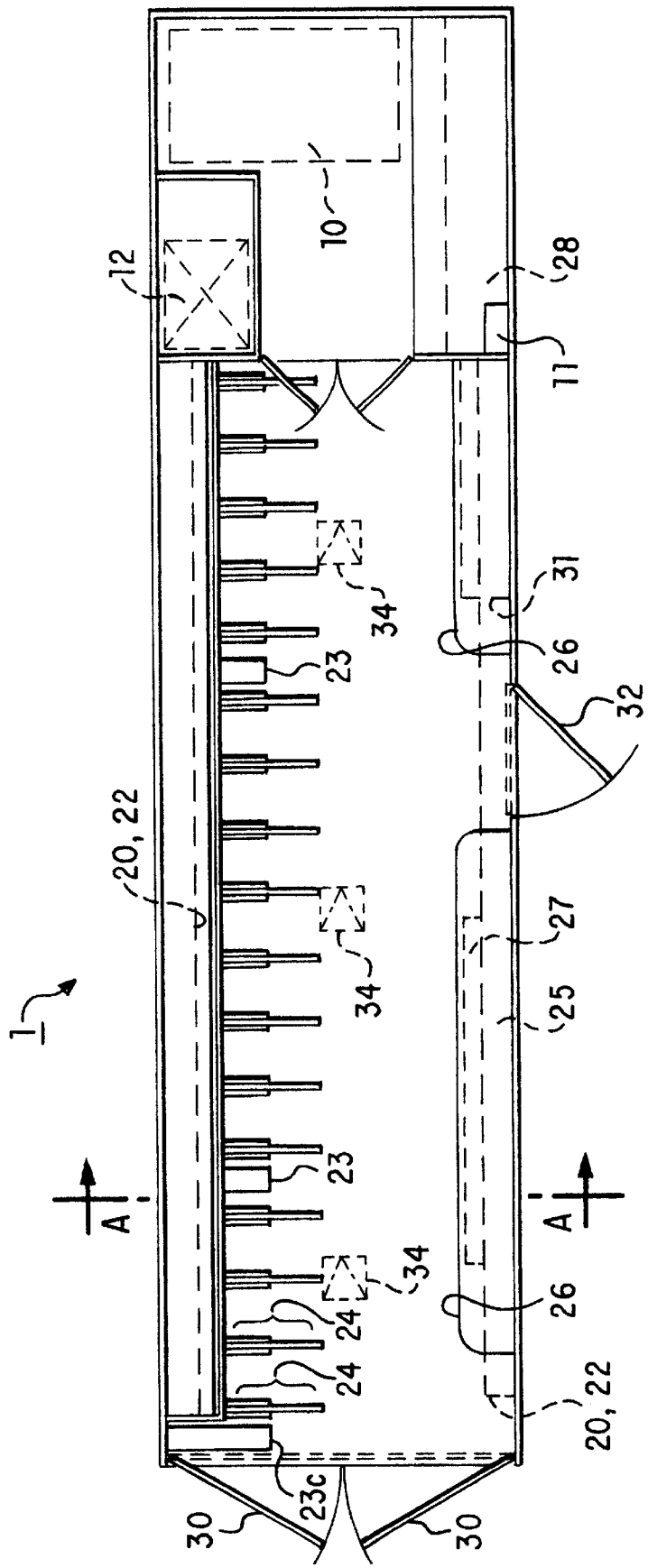
FIG. 1 is plan view of the mobile fabrication unit according to the present invention.
Figure 2:
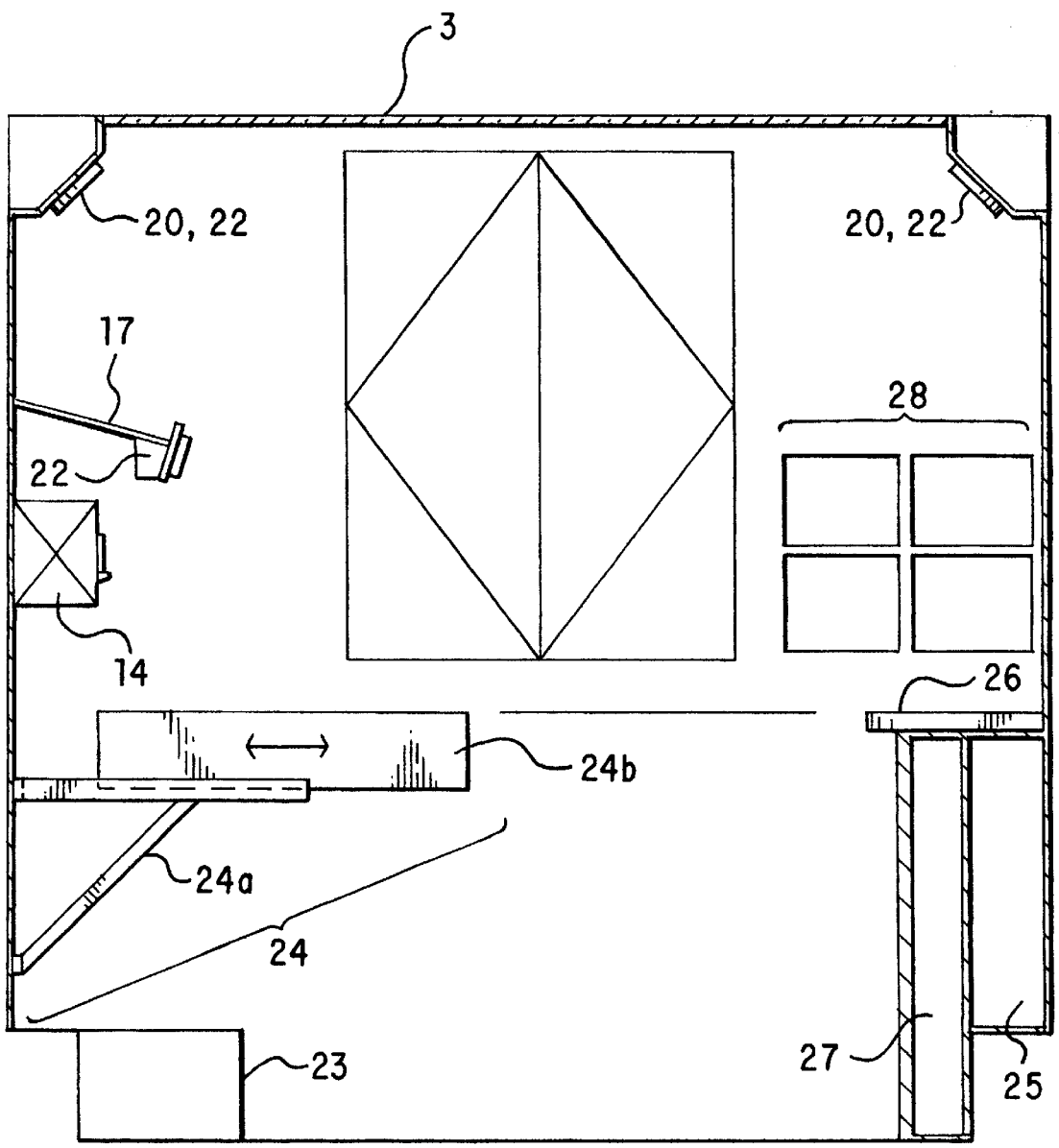
FIG. 2 is a cross-sectional view of the fabrication unit taken at line A—A in FIG. 1.
Figure 3:
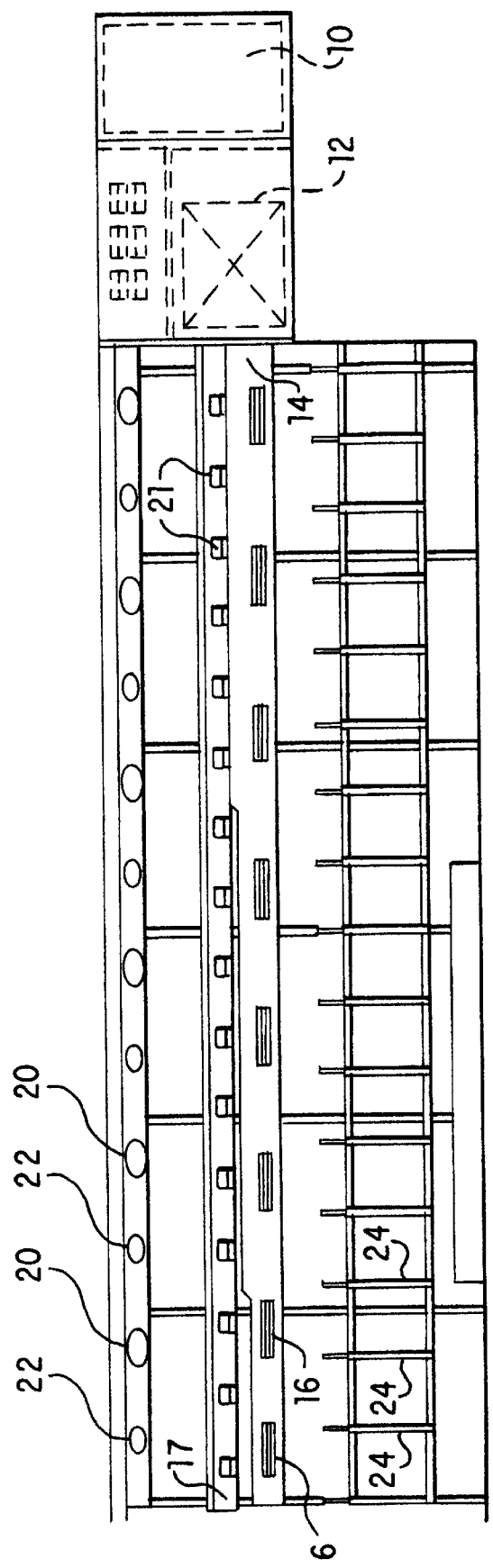
FIG. 3 is a cross-sectional view showing the left side of the interior of the fabrication unit shown in FIG. 1.

The system according to the present invention includes a housing, preferably in the form of a wheeled vehicle body, such as trailer 1, as seen in FIGS. 1–4. For clarity, the wheels of trailer 1 are not shown.

Also, for the purpose of discussion, only the example of a trailer is discussed here. However, it is contemplated and emphasized that an alternative arrangement of the present invention may, for example, take the form of a motor vehicle provided with an engine, a steering system, etc. Such motor vehicles may include conventional panel trucks or stepvans having their interiors equipped and laid out according to the present invention.

The type of vehicle that can be used is variable, and corresponds to a desired capacity for fabrication and available manpower. For example, a smaller step van may be manned by even a single worker for smaller jobs, whereas a longer trailer may be manned by 2 to 4 workers, and offers an increased fabrication capacity.

The trailer 1 has transparent or translucent wall and/or ceiling panels which transmit ambient exterior light, such as sunlight, to the interior of the trailer to permit natural light illumination thereof. This helps to reduce power consumption, and, therefore, operating costs, by reducing the need for electric interior lights.

In addition, some solid surface material stock is supplied in a variety of colors (e.g., Corian is supplied in 51 colors). Therefore, in processing and fabricating the solid surface material, color matching is an important issue. Thus, it is very useful to provide natural sunlight to the interior of the trailer for the purpose considering the "natural" coloring of the solid surface material. In this regard, the present inventor has found that it is advantageous if at least 50% of the surface area of the trailer ceiling is made of light transmitting (translucent or transparent) material as shown at 3 in FIG. 2.

In addition, the trailer is preferably provided with task lighting 22 under any horizontal shelves that extend above the work surface so that the shelves do not cast shadows on the work surface.

The trailer 1 also includes a power supply, such as a conventional gas-powered generator 10, for generating electricity. Alternatively or in addition, a power line hookup 11 may be provided, whereby electrical power can be drawn from an onsite source, such as from power cables located onsite. Also, a portable power generator may be used, according to the present invention. The power requirements according to the present invention are expected to be highly variable. However, presently contemplated power loads are about 7500–8000 kW.

A plurality of conventional electrical outlets 21 are provided at various convenient locations within the trailer 1, such as at intervals along an edge of tool shelf 17, discussed further below. The electrical outlets are provided, for example, in quad-clusters of conventional, three-pronged outlets. All of the electrical outlets are electrically connected to the power supply, such as the gas generator 10. Preferably, the outlets and lights are provided on a separate circuit.

The present inventor has found that fabricating efficiency is improved if there is always an outlet within easy reach of the fabricator. Accordingly, to facilitate fabrication, the trailer preferably includes at least one outlet for every two linear feet of trailer length and the outlets are provided on at least one of the longitudinal side walls of the trailer such that there is no more than three feet between adjacent outlets, and there is at least one outlet for every two linear feet of side wall length.

The fabrication of solid sheet materials involves extensive cutting and sanding, which in turn generates significant amount of cutting and sanding dust. In a relatively small enclosed space, such as a trailer where fabrication is taking place, much of this dust will be airborne. The presence of excessive amounts of airborne dust can significantly impact the working conditions in the trailer in a negative way. Thus, the present inventor has found that it is critical to provide ventilation means for removing excess cutting dust.

An active (for example, fan-driven) ventilation unit 12, preferably powered by the aforementioned power supply, is provided and preferably includes an air filtering mechanism to remove particulate matter, especially cutting and sanding dust, generated during the fabrication process. In particular, the ventilation system unit draws air out from the interior of the trailer 1 and discharges it to the exterior thereof. The air is preferably filtered by the aforementioned air filtering mechanism before being discharged. The air filtering mechanism may be conventional, as long as it is effective for substantially removing the particulate matter associated with cutting and sanding the solid surface construction material.

The capacity of the ventilation unit depends, to a large extent, on the interior volume of the trailer. Since the trailer's height and width are generally constant within a narrow range, the necessary ventilation capacity can be related to the length of the trailer. More specifically, the present inventor has found that to ensure adequate removal of airborne dust, the trailer should have a ventilation capacity of at least 100 cubic feet per minute (cfm) for each linear foot of trailer length. Thus, for example, a 26 foot trailer must have ventilation capacity of at least 2,600 cfm. Preferably, however, the trailer should have even more ventilation capacity, i.e., in excess of 250 cfm per linear foot of trailer length. The currently preferred embodiment of the present invention, for example, has ventilation capacity of 7,200 cfm in a 25.75 foot trailer or about 280 cfm per linear foot.

In particular, the ventilation system according to the present invention includes an elongate exhaust duct 14 connected to the fan-driven ventilation unit 12. The exhaust duct 14 preferably extends along the longitudinal length of the trailer 1, and more preferably extends substantially the entire longitudinal length of the trailer. As shown, the duct 14 has one end adjacent the ventilation unit 12 and one end remote therefrom. The duct 14 preferably tapers toward the remote end so that the remote end is smaller in at least one direction so that the sectional area of the interior of the duct is smaller at the remote end. The exhaust duct has a plurality of apertures 16 provided therein, through which air is taken in from the interior of the trailer 1. The apertures 16 can be independently opened or closed in order to provide or even concentrate airflow in particular portions of the interior.

In keeping with the desire for increased efficiency according to the present invention, the ventilation unit 12 is actuable by a pull-cable extending along the longitudinal length of the trailer 1. The pull-cable is connected to a microswitch or the like to provide pull-on/pull-off operation of the ventilation unit 12. Thus, a worker can pull the cable from virtually anywhere along the length of the trailer, without having to go to a specific switch and possibly interfering with coworkers.

In addition, passive vents 34 may be provided in, for example the ceiling of trailer 1. The provision of vents 34 provides a consistent airflow inwardly from the vents 34 and outwardly through the apertures 16 in the exhaust duct 14.

The trailer 1 is equipped with a plurality of conventional, electric-powered tools (not shown) for fabricating the solid surface material, powered by (i.e., plugged into) the aforementioned electrical outlets 21. The tools are characteristically distributed throughout the interior of the trailer 1 so as to be "within arm's reach" from virtually any location. This is advantageous because, again, workers do not need to move very far, if at all, within the trailer 1 to reach a required tool. Therefore, one worker is less likely to interfere with another's work. Accordingly, productivity increases. The tools provided in the trailer are those conventionally used for solid surface material fabrication, such as routers, sanders, and the like. Each tool is held on a tool shelf 17 mounted on a wall portion of the trailer.

The trailer also includes climate control means in the form of heating and/or cooling systems. Climate control within the trailer is, of course, important to ensure the personal comfort of persons working within the trailer. The present inventor has found, however, that even more precise localized climate control is important in the fabrication process. In particular, during the fabrication process various adhesives and other compounds are used to join pieces. The rate of drying of these adhesives depends on the temperature. The present inventor has found that the adhesive will dry too slowly if the temperature in the region where such an adhesive is applied is below 55° F. Conversely, if the temperature in the region where the adhesive is applied is above 90° F., the adhesive will dry too quickly. Thus, the fabrication process of the present invention preferably includes the step of maintaining the area around the solid surface material, particularly the region where adhesive is applied, at a temperature between 55° F.–90° F. The present inventor has found that the optimal temperature range is 60° F.–75° F. Thus it is most desirable to provide a climate control means that can maintain the temperature of the region where adhesive is applied at 60° F.–75° F.

To achieve the desired heating or cooling, the climate control means preferably comprises a plurality of climate control units 23 such as radiant heaters, hot air blowers, air conditioners, heat lamps or heat pumps or a combination thereof. The currently preferred embodiment includes two radiant heaters 23 located under the solid sheet supports. The radiant heaters are spaced along the length of the trailers. Another preferred embodiment includes hot air blowers that are located on the floor of the trailer. The hot air blowers draw air from beneath the trailer or from the side of the trailer, heat the air (if desired) and blow the air upward toward the solid surface material that is supported on the solid surface supports. The heating function can be disabled so that the blower serves as a cold air blower.

The preferred embodiment of FIG. 1 further includes a cooling unit 23c at a location near the back of the trailer. The cooling unit extends from a side wall of the trailer.

The location of the climate control units 23 beneath the solid surface support 24a, 24b is important because it permits more precise localized climate control in the vicinity of the solid surface material that is being fabricated in addition to more generalized climate control. Thus, for example, the temperature in the area where adhesive is being applied can be maintained in the range of 60° F.–75° F. by blowing hot or cold air onto the bottom side of a segment of solid surface material that is supported on the solid surface support. By providing a plurality (two or more) of climate control units 23 that are spaced along the length of the trailer it is possible to control the temperature at discrete segments of the solid surface material without controlling the temperature along the entire length of material that is being fabricated. Thus, for example, if one person is applying adhesive that requires temperature control while another person is performing a step that does not require temperature control (e.g., sanding or cutting) the unit that controls the temperature of the section of material proximate the person applying adhesive can be operated while the other unit can be turned off, if desired.

Locating the climate control units 23 beneath the solid surface material supports also helps in meeting the challenge of controlling climate/temperature while at the same time moving large volumes of air to remove dust. Specifically, the present inventor has recognized that dust removal is particularly significant in the region above the solid surface material. On the other hand, the inventor has recognized that the overall climate within the trailer can be controlled from a variety of locations within the trailer, but that the temperature in the critical region where adhesive is applied to the solid surface is best controlled from beneath the solid surface supports. In particular, when solid surface material is supported on the solid surface supports 24a, 24b and the ventilation units are provided above the solid surface material, the region beneath the solid surface material is, to some extent, a dead air zone that is not affected by the ventilation units. This is not a problem in connection with ventilation because dust located below the solid surface material is not a significant problem. Moreover, since the air is to some extent trapped under the solid surface material, the temperature of the air will not be significantly affected by the ventilation units. In other words, despite the fact that the ventilation unit moves large volumes of air the air under the solid surface material is not as quickly replaced as other air within the trailer. Thus, it is most efficient to control the temperature of the air in this region so that the temperature of the solid surface material (which is the upper boundary of the dead air region) can be controlled with some precision. Natural convection and heat exchange provide ancillary heating or cooling of the entire trailer. For these reasons, it is an important aspect of the present invention that the climate control units be located under the solid surface supports 24a, 24b and that the ventilation units be located horizontally above the solid surface supports.

Alternatively or in addition, the trailer 1 could be provided with a plurality of heat lamps 20 distributed through the interior thereof. The heat lamps raise the temperature within the trailer to promote rapid glue curing in a gluing step of the fabrication process. The heat lamps 20 also warm the interior of the trailer 1 in cold weather months to make working conditions more comfortable for the crew working therein.

In addition to the heat lamps 20, the trailer 1 may be usefully provided with at least one hot air heater unit which is conveniently located to heat the air within the trailer 1.

Also, the trailer 1 may be provided with one or more "hot boxes" (not shown). A hot box is a small, toaster oven-sized unit which has an interior space which can be selectively heated. A hot box is particularly useful for heating adhesive materials used in the fabrication process to a useful temperature level, particularly in cold weather months.

The trailer 1 may also be provided with lighting units to provide, or supplement, the light within the trailer 1. The lighting units may be, for example, a plurality of conventional lighting units 22 using incandescent or fluorescent light bulbs. The lighting units 22 are distributed about the interior of the trailer 1, such as along one or both of the side walls.

The heat lamps 20 and the lighting units 22, as well as the hot air heater(s), tools, and hot box(es), are powered by the aforementioned generator 10 or other power supply. Thus, it is noted here that the generator 10, (or alternative power supply), necessarily must be of sufficient capacity to adequately power the equipment connected thereto.

The electrical system in the trailer 1 preferably includes two circuits, each "guarded" by a respective circuit breaker panel from which power supply is selectively controlled. One circuit includes the utilities, such as the lighting units, the heat lamps, the hot air blowers, the hot boxes, etc. The second circuit includes the electrical outlets, and, therefore, the fabrication tools, such as routers, sanders, and the like.

Thus, the heat lamps 20 and lighting units 22 may be turned on and off from one of the circuit breaker boxes, which may be located at the forward end of the trailer 1, for example. In an alternative arrangement, the heat lamps 20 and lighting units 22 may be operated by a pull cable system similar to that used with the ventilation system 12, with similar advantages in increasing efficiency.

In a typical arrangement, the heat lamps 20 in the forward and rearward "halves" of the trailer 1 can be independently turned on and off. The lighting units 22 are collectively turned on and off.

Finally, the trailer 1 includes several shelf spaces and work bench areas. In particular, one side of the trailer is provided with a plurality of spaced apart and generally aligned support struts 24. In a particular example, the plurality of support struts 24 extend in a transverse direction of the trailer 1 and are substantially parallel to one another. Collectively, the support struts 24 support the solid surface material while it is being fabricated. When the solid surface material stock is pre-provided with a protruding element, such as a washbasin bowl, the protrusion may be arranged to fit between the support struts 24 so that the solid surface material is still conveniently and securely supported while being fabricated.

The support struts 24 are preferably adjustable with respect to height, direction of extension in a horizontal plane, and angle of extension in a vertical plane. They may, for example, slide along guide rails, grooves, or the like, and lock into a desired position. This can be done by conventional positional controlling mechanisms such as friction locks or the like.

In a preferred example, each support strut comprises a first portion 24a which is attached to the trailer wall, and second, slidingly extensible portion 24b which extends in substantially the same direction as the first portion 24a. Thus, the effective length of transverse extension of each support strut 24 can be selectively extended. Each second portion 24b may, for example, be provided with a cleat or other protrusion (not shown) along its bottom edge. The cleat slidingly engages a corresponding groove or slot in first portion 24a (not shown), such that second portion 24b can slide back and forth, but cannot be pulled in a direction perpendicular to the direction of sliding (i.e., directly upwardly).

In a particularly preferable arrangement, each second portion 24b is made from a sacrificial material, such as particle board, or lesser quality wood. However, the sacrificial material chosen must maintain sufficient rigidity to securely provide support. The use of a sacrificial material here is particularly useful because, when the solid surface material is trimmed with a router saw and the like, the underlying second portion 24b can simply be cut through, without needing to constantly reposition a work piece to avoid the second portion 24b. Thus, each second portion 24b becomes progressively nicked and partially cut, and is simply and conveniently disposed of when its structural integrity is sufficiently degraded.

At least one workbench area 26 is provided along the side of the trailer opposite the plurality of support struts. Preferably, this workbench comprises at least one elongated surface extending along the side of the interior of trailer 1. The aforementioned hot box can be placed on the workbench 26.

The support struts, with solid surface material supported horizontally thereon, constitutes the principal work surface within the trailer. It follows that to achieve efficient space utilization, the supports should extend substantially along the entire length of one side wall of the trailer. Thus, in accordance with another aspect of the present invention, support struts are provided along at least 70% of the length of the trailer side wall.

In addition, since solid sheet stock material typically comes in 12 ft. lengths, it is preferable that the length of the support surface within the trailer and the trailer itself be substantially a multiple of 12. More specifically, the length (L) when measured in feet of the support surface, measured in feet should be X(Y), where X is a whole number and Y is a length between 12–13 ft. Likewise, the interior length of the trailer sidewall on which the supports are mounted, when measured in feet, should be X(Y), where X is a whole number and Y is a length between 12–13 ft.

In addition to the foregoing features, convenience items, such as storage cabinets and work shelves and storage shelves may be provided in the interior of the trailer as required or as desired. For example, a storage cabinet 28 extends forward substantially to the front end of the trailer 1 for storing elongate materials such as particle board strips, straight edges, and bench strips.

Also, underneath the rear workbench 26, slot compartments 25 and 27 may be provided for storing particle board stock and solid surface material stock respectively.

Figure 4:
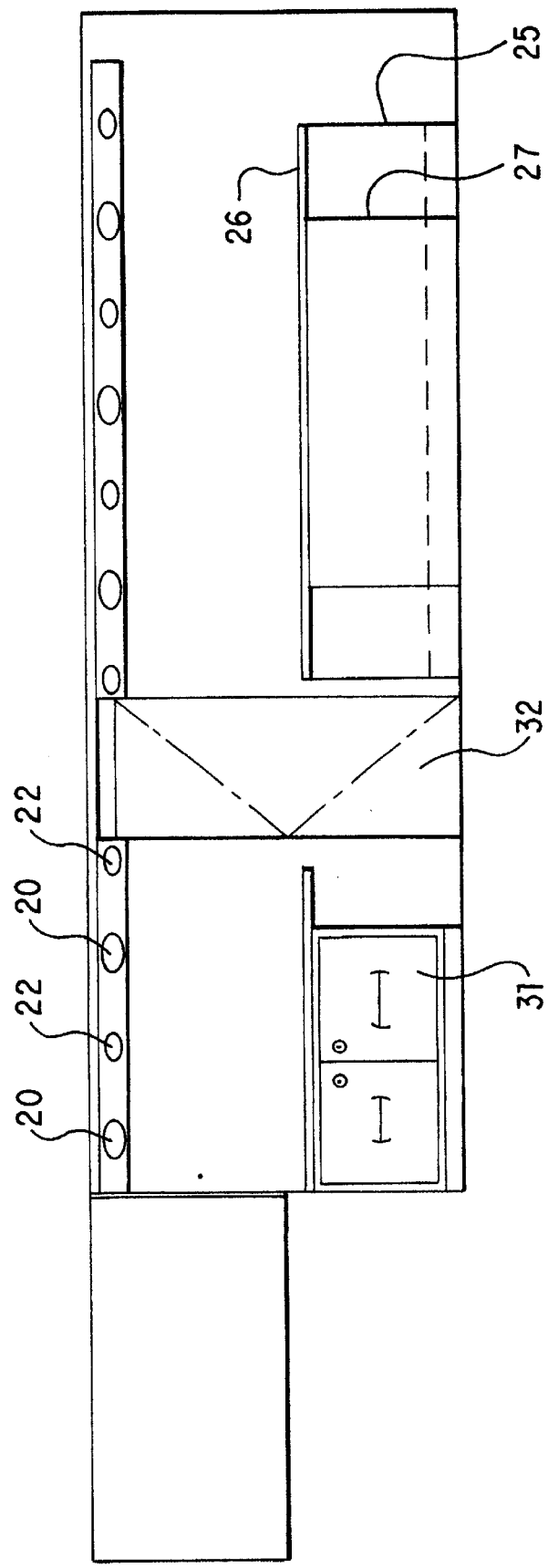
FIG. 4 is a cross-sectional view showing the right side of the interior of the fabrication unit.

An additional cabinet 31 may be provided under the forward workbench 26 (see FIG. 4).

Finally, the trailer 1 has at least one, and preferably two doors to allow entry into the interior thereof. A door 30 is provided at the rear end of trailer 1. Door 30 is preferably sized so as to permit full sized pieces of sheet construction material stock to pass freely therethrough. Also, a door 32 may be provided at the side of the trailer 1 to allow workers to enter and exit trailer 1.

Both doors are preferably left open, but are installed with a curtain (not shown) thereacross, similar to the type seen in the doorways of walk-in commercial freezers. Such curtains are commercially available from, for example, Grangers, an industrial supply store, under the name "Vinyl Slat Door". In general, the contemplated curtains include a plurality of flexible strips or slats made of plastic or vinyl or the like and hang, at rest, such that the individual plastic strips collectively shut off the doorway. This is important to retain heat in the trailer, for example. Moreover, the curtain structure enables a worker who may have both hands full to simply walk through the curtain (i.e., between the individual plastic strips) to enter and exit the trailer, without having to open and close a door. In addition, the curtains offer protection to those immediately outside the doors from being sprayed with debris thrown up from the routers and the like.

Finally, the curtains, depending on the material of manufacture, offer privacy to the workers in the trailer. In a preferable arrangement, in this regard, a lower portion of the curtain strips is substantially opaque to provide privacy, and an upper portion is transparent or translucent to permit exterior light to enter the trailer.

The fabrication process according to the present invention involves bringing the trailer to the worksite, forming a template directly on the solid surface material, cutting, while in the trailer, the solid surface material according to the template laid out thereon, forming the nose and head portion on the sheet material, and installing the fabricated solid surface material. Preferably, the trailer is brought within about 100 yards of the worksite because of the need to carry the solid surface material back and forth between the worksite and the trailer. Since this is frequently done by hand, it is desirable to reduce the distance the solid surface material needs to be carried. Thus, according to the present invention, the solid surface construction material is brought directly onto the worksite, possibly carried by the trailer itself. By laying out a template (that is, marking) directly on the solid surface material, the need for the conventional temporary template, as discussed above, is obviated. In particular, with the increased accuracy of subsequent fabrication, an additional fitting or adjusting step is virtually eliminated when the fabricated solid surface material is put into place. That is, the fabrication, done according to the present invention, is made so much more accurate that little if any adjustment has to be made in order for the fabricated piece to fit as desired. This virtual elimination of a complete step is a significant part of the time and work savings.

In addition, for reasons noted previously, the process of the present invention preferably includes the step of maintaining a region of the solid surface material where adhesive is applied at a temperature within the range of 55° F.–90° F. and more preferably within the range of 60° F.–75° F. The process also preferably includes the step of ventilating the mobile fabrication unit so as to displace at least 100 cubic feet per minute of air for every foot of mobile fabrication unit length.

Figure 13:
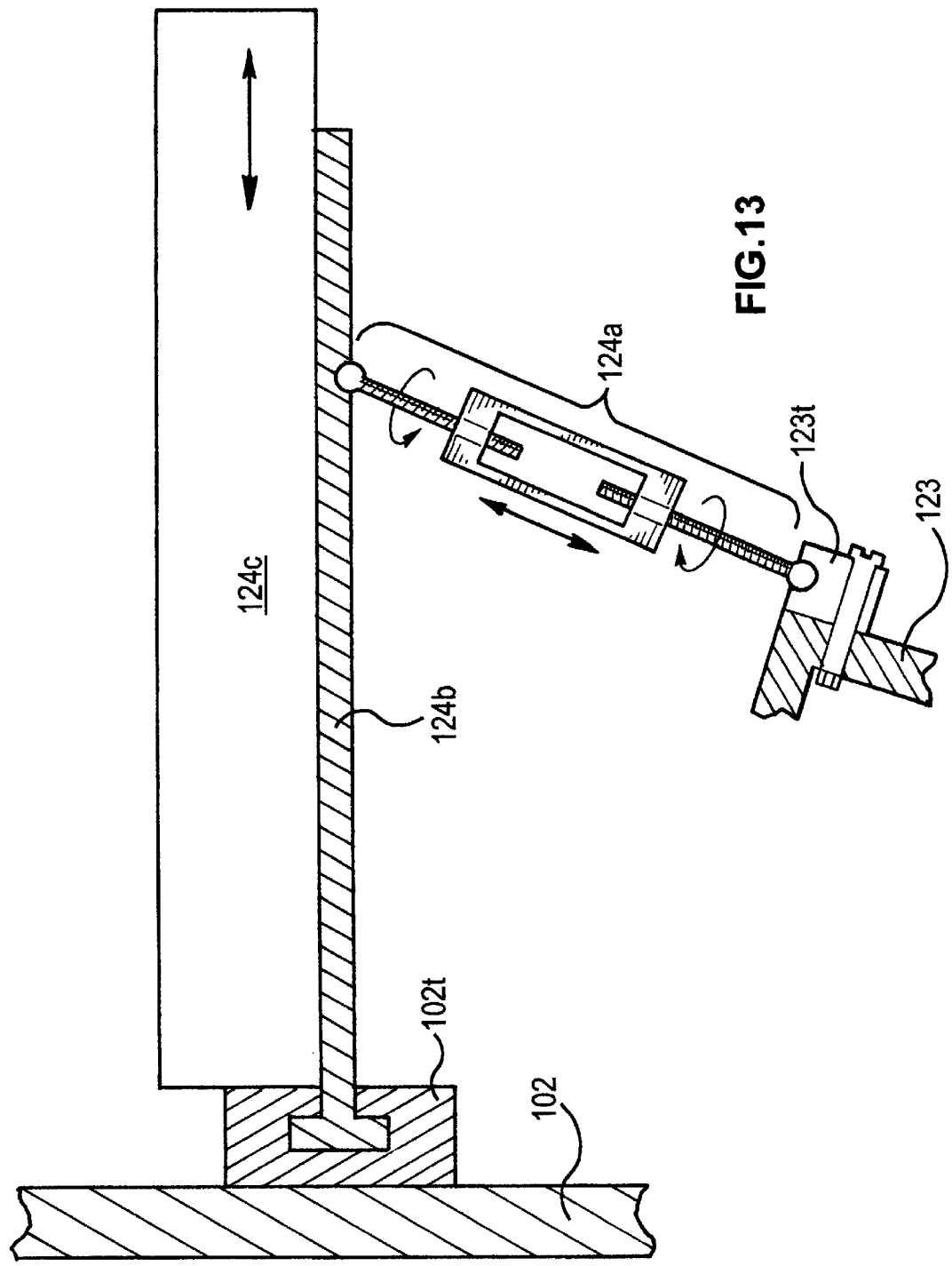
FIG. 13 is a detail view, partly in section, of a slat support assembly according to the present invention.

FIGS. 5–8 show a fabrication station according to the present invention integrated into a trailer 101 that includes a fabrication side wall 102 and a storage side wall 103. As shown in FIGS. 5–8, the trailer includes two fabrication stations 117 along the fabrication sidewall 102 (the left wall in FIG. 5). Each of the fabrication stations is preferably 12 feet long since the solid surface material is typically supplied in 12 foot lengths. The term "fabrication station" as used herein refers to a complete fabrication unit that includes spaced solid surface supports 124 for supporting the solid surface material being worked on (i.e., the "work piece"). The solid surface supports 124 include a bench adjustment rod 124a, a first slat support channel portion 124b and a second slidably extensible portion 124c. The details of the solid surface support assembly are shown in FIG. 13, which is discussed below. As discussed in detail below in connection with FIGS. 14A–15A, the slidably extensible or removable slat portions 124c may be replaced to provide a wide variety of support surfaces.

The fabrication stations 117 are integrated into the trailer 101 to provide a work surface heat supply plenum or chamber 123 that extends substantially along the same length of the trailer as the spaced supports 124. An exhaust (air removal) plenum or chamber 127 with spaced exhaust vents 127v extends substantially along the length of the trailer. A heating and ventilation air intake plenum or chamber 129 (including spaced vents 129v) is provided on each side 102,103 of the trailer substantially along the length of the trailer. The trailer also includes lighting 122, storage shelving 114, a worktable 115 (including storage racks), power tool shelving 116 tool storage 119 and a swing up table saw 131.

As shown, the fabrication station side 102 of the trailer (left side in FIG. 5) includes the continuous chambers or plenums 123, 127 and 129. The chamber sections are hollow to provide forced air passages and also provide routing for all the utilities needed in the particular work station. The utilities and forced air (hot, cold, fresh etc) can be generated by known devices proximate the fabrication station or supplied from known remote sources depending on the environment in which the fabrication station is used. The top of the middle chamber 127 provides a tool shelf 116 with a shelf for commonly-used tools within easy reach of the fabricator. Electrical outlets 121 are attached to the chamber 127 (but could be arranged along the wall 102) near the tool shelf 116 so that the tool stored on the tool shelf are always plugged in and available for quick use. If pneumatic tools are to be used, the tools will be connected to a common compressed air source. A supply shelf 118 is also secured to the chamber 127. Task lighting 122 is provided on the lower side of both of the two uppermost plenums 127, 129 to illuminate the workpiece surface. All the utilities 113 (e.g., compressed air for pneumatic tools, vacuum supply, fuel for heat exchangers, electrical wiring for the electrical outlets, fans, heaters, lights and coolers) can be provided within the plenum or chambers 123, 127 and 129. Again, the utilities and forced air (hot, cold, fresh etc) can be generated by known devices proximate the fabrication station or supplied from known remote sources depending on the environment in which the fabrication station is used.

The exhaust chamber 127 provides passage for exhaust air to an exhaust vent at another end of the vehicle or in the factory to the ventilation system in the factory itself. The hollow chambers 123, 127 and 129 are preferably screwed directly into the wall 102 and are preferably a fiberglass component that is very rigid and durable. The supply for the aforementioned utilities (e.g., compressed air lines, vacuum lines, fuel lines and electrical wiring) is preferably precon Fig.d or "prewired" prior to attachment of the fiberglass component to the support wall 102. As noted earlier, the utilities and forced air (hot, cold, fresh etc) can be generated by known devices proximate the fabrication station or supplied from known remote sources depending on the environment in which the fabrication station is used.

The work surface heating supply chamber 123 is similar to the exhaust chamber except the chamber houses heat supply units that are located within the chamber. The term "heat supply unit" as used herein is intended to include both separate sources of heat at each location and a common source of heat that can be selectively applied at each location. Thus, for example, a central source of hot air could be used to supply hot air to the chamber 123 so that the opening or closing of the vents 123v (possibly associated with the turning on of a fan or blower) would determine whether or not heat was supplied. Alternatively, separate heaters could be provided at each location. In the context shown, namely a mobile fabrication unit, the heat supply units may be propane burners with blowers at the heat supply 123v. In a stand alone environment, on the other hand, hot water piping that runs to individual heat exchangers or electrical induction may be used as the heat source.

Figure 7:
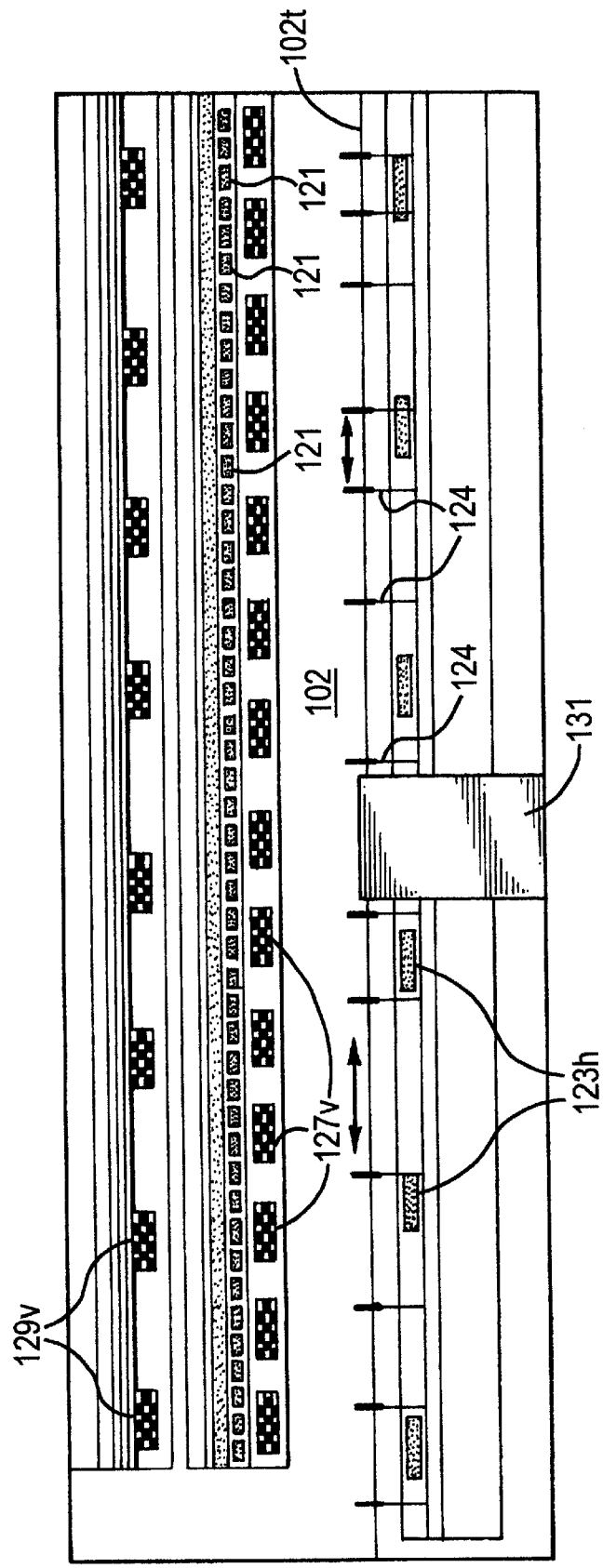
FIG. 7 is a plan view of the fabrication station side of the trailer of FIG. 5.

As shown in FIG. 7, there are six heat supply unit vents 123v (work surface heating vents) and all six of the vents can be controlled individually. As detailed below, the activation or deactivation of the heat supply units is preferably controlled by a switch. The switch either turns on a separate heat supply unit or, in the case of common heat source, controls the opening or closing of the vents 123v (through the use of a damper with louvers, for example) and/or the turning on of a fan or blower to initiate or cut off the supply of hot air. Thus, the trailer 101 has six different heat supply unit locations 123h (three associated with each fabrication station 117) that can either supply heat or not supply heat. The user can heat all six at once or just pick one and heat it and/or cool air on others or natural air or air from, the surrounding air without running air through them. Providing the fabrication station with spaced heat supply units 123h allows fabricators to perform vastly different tasks on a work piece at the same time. For example, if somewhere along the length of the 12 foot workpiece, (e.g. down three feet from one end) there is an undermount bowl, the fabricator could put that bowl on the work piece and initiate the surface heat supply units 123h to warm the bowl area. At the same time, the fabricator might be putting in some nosing, which doesn't require heat. One of the benefits of having discrete surface heat supply units 123 in the fabrication station is that the users can do multiple steps at one time. Thus in the embodiment of the fabrication station shown in FIGS. 5–8, more precise control of heat is possible. Instead of having the complete bench area heated, or having half the bench bathed in heat, the fabricator can actually isolate a small discrete area.

Figure 5:
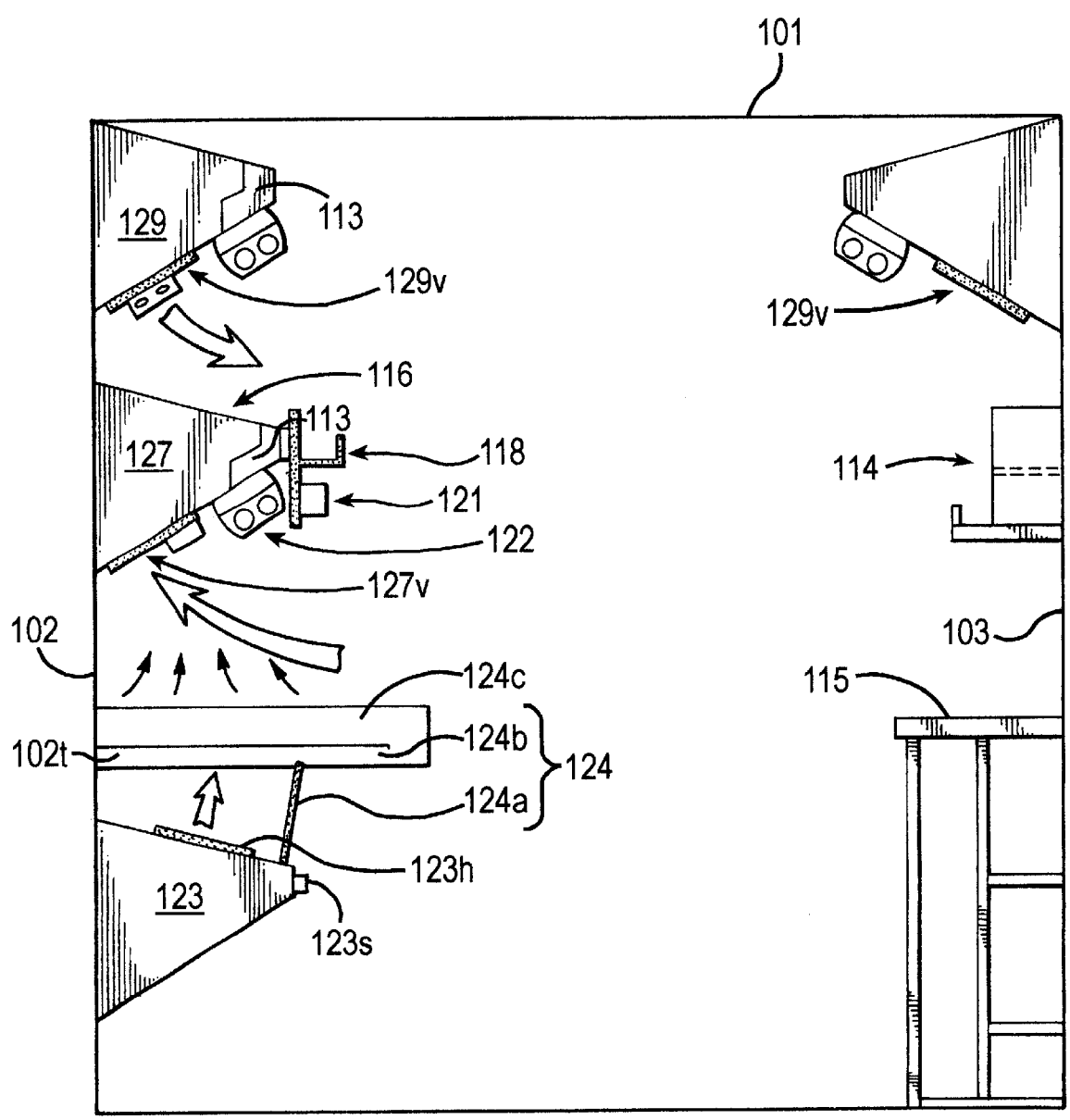
FIG. 5 is a sectional view of a fabrication station according to the present invention integrated into a trailer according to the present invention.
Figure 6:
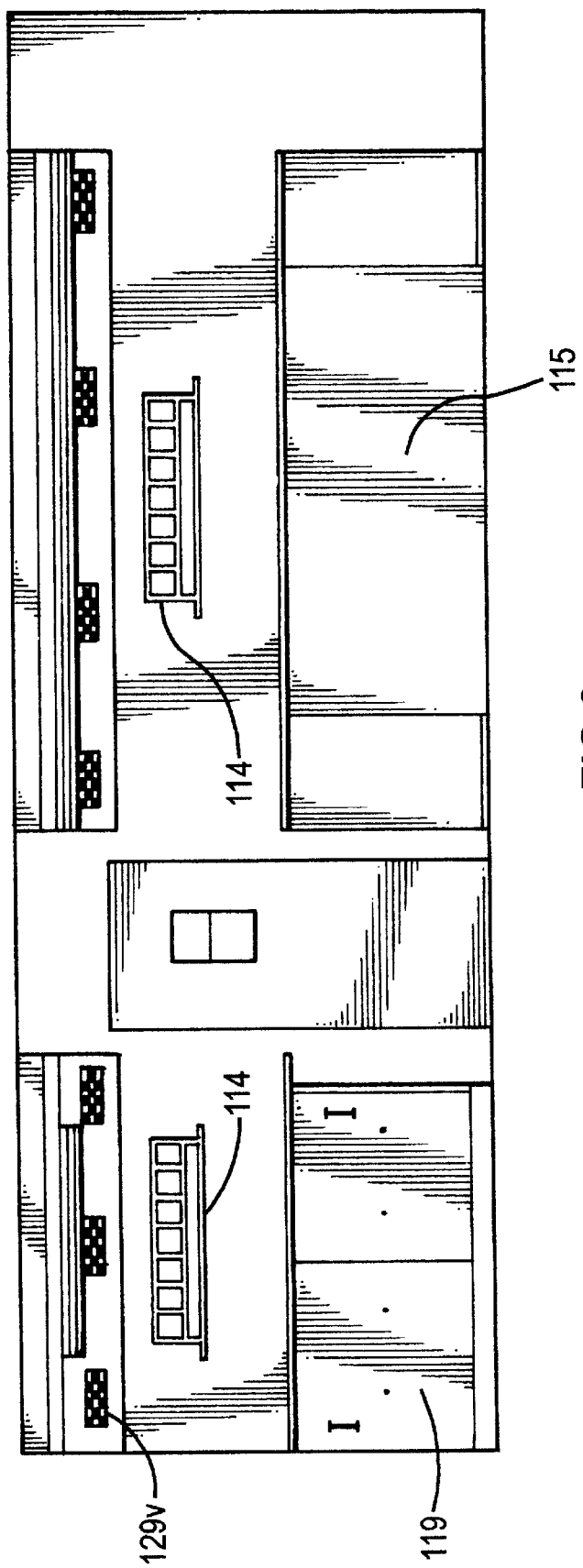
FIG. 6 is a plan view of the storage and entry side of the trailer of FIG. 5.

The embodiment of FIGS. 5–8 also allows the fabricator to direct the heat onto the surface that the fabricator is working on. In particular, as best shown in FIG. 5, the vents 123v of the heat supply plenum or chamber 123 are angled so as to blow hot air proximate the center of the slidably extensible second slat portion 124c, which generally corresponds to the lateral center of the solid surface material work-piece.

The fabrication station and method of the present invention are designed to minimize movement of the work-piece to improve efficiency. Ideally, the solid surface material workpiece can be entirely fabricated on the fabrication station. The product is cut to rough size on the bench, it is nosed on the bench, it is flipped back over on the bench, and is routed on the bench, and it is sanded on the bench.

Another significant aspect of the fabrication station of the present invention is the use of circulating air to remove dust and provide an air barrier to protect the fabricator from dust. In the system shown in FIGS. 5–8, there is no down draft type dust removal system. Instead, dust is either pulled off the surface of the work area and into the exhaust vents or allowed to fall to the floor. The user is protected from dust by virtue of an air barrier created by the air circulation system of the present invention. Thus, even without a down draft table system, dust generated in small tasks, hand sanding tasks and the like does not interfere with the user's breathing.

As indicated by arrows in FIG. 5, ventilation air is coming in over the user's head right towards user's face, right toward the user's breathing area. The air intake helps to make up some of the air that the exhaust vent system is removing and thus prevents or minimizes a negative air pressure build up within the trailer. Because the intake 129v is high, and the exhaust vents 127v are lower (about belt-high on the user) an airflow barrier (or air curtain) is maintained between the user's face and the work piece being worked on. The air flow barrier tends to force the dust in its natural direction, which is down, keeping the air near the fabricator's face (the air the fabricator is breathing) very clean air and forcing dust and debris right out the exhaust vent or onto the floor.

The heating and ventilation intake or supply chamber 129 is provided near the top of the fabrication station. In the embodiment shown, there are eight heating and ventilation vents 129v across the top. The heating and ventilation air supplied could be hot air or it could be cold air. In the embodiment shown, the heating and ventilation vents 129v are controlled in groups of four (front and back) since there is no need for discrete precision ventilation. Typically, four of the vents are open and four of the vents are closed. For example, the front four may be open while the back four are closed off, or vice versa. The temperature of the intake air is basically a matter of the fabricator's preference, but the air should be relatively dust free.

In the trailer installation shown in FIGS. 5–8, heating and ventilation intake vents are provided on the opposite side of the trailer. All of this ventilation is provided for the fabricator's comfort. The air of the vehicle changes very quickly. The exhaust vents are moving a tremendous amount of cubic feet of air out of the vehicle, so a lot of makeup air is needed. In a factory setting, the fabrication station will not require the same intake air capacity because the ambient air will easily replace the air drawn through the exhaust vents 127v and create an effective air barrier even without the intake vents 129v.

In the context of a trailer, it is preferred that the capacity of the intake air chamber (through open vents) should be equal to or exceed the capacity of the exhaust chamber so that there is a positive pressure within the chamber that tends to push air out of the trailer. In other words, the interior of the trailer 101 has an air pressure slightly greater than the exterior so that air can be readily exhausted. The air that is exhausted through the exhaust vents 127v will be filtered.

The reason for having the intake valves 129v and having a lot of intake is that simply exhausting air, drawing air out, without drawing air in would create a negative pressure—a vacuum—in the trailer. In a closed trailer, the fabricator has a difficult time opening the doors if the exhaust exceeds the intake. There is a tremendous vacuum, and that causes problems in terms of trying to vent out dust-laden air.

Figure 8:
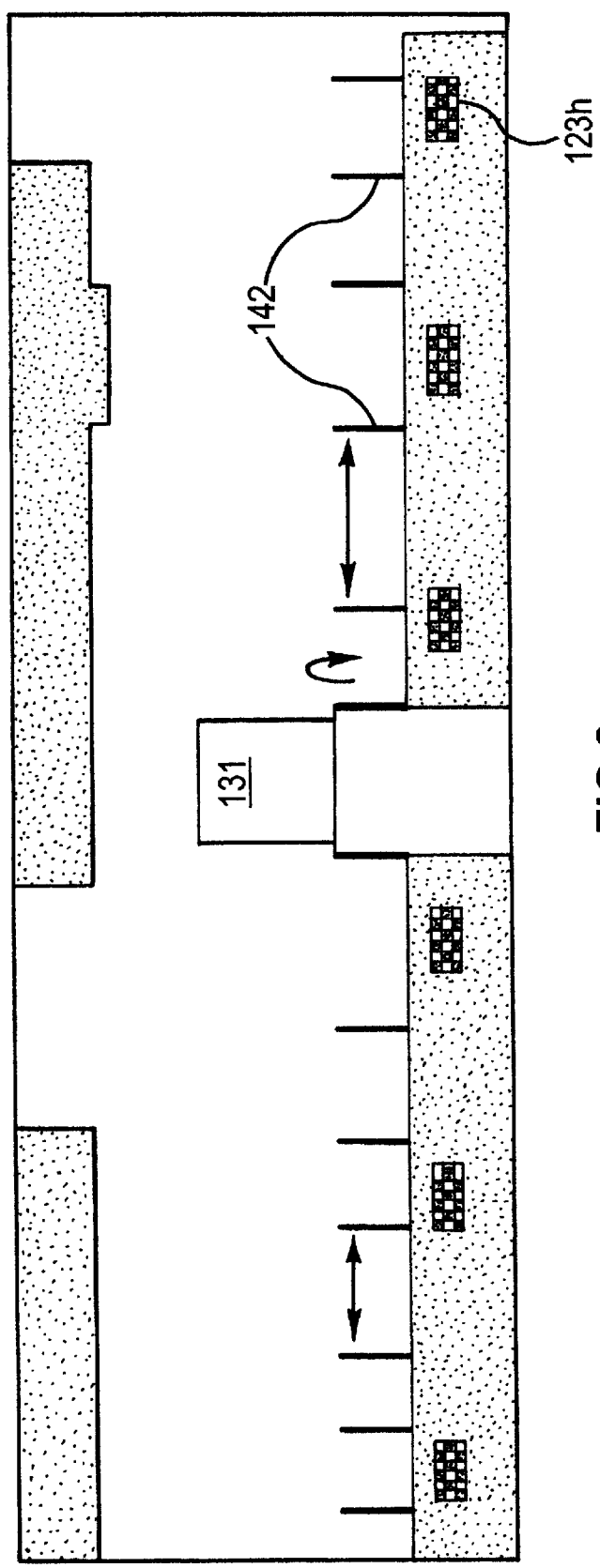
FIG. 8 is a top plan view of the trailer of FIG. 5.

FIG. 8 shows the size of the bench slat system in comparison to the size and the distribution of the heat supply units 123h that are in that system thus demonstrating how much of the bench can be covered by having directional vents on the heat supply units. FIG. 8 shows that the heat supply units are near, but not quite, to the center of the work surface (which extends to the end of the supports). As shown in FIG. 5., however, the heat supply unit discharge vent 123v is angled. The angle of discharge will cause the heated air to go directly to the center of the sheet if the sheet is placed directly on top of the slat system 124.

FIG. 8 also shows that the fabrication station 117 is interrupted by the swinging table saw assembly 131. This feature is unique to the mobile trailer use of the fabrication station since a factory ordinarily has a table saw in a different location.

The table saw, indicated schematically at 131, is mounted to a swinging table surface. When the table saw table is horizontal (as most table saws will be) the fabricator can pull a lever and the table saw surface will swing down so that the table will move into a storage position—out of the fabricator's way so that it doesn't protrude any further. During fabrication a fabricator needs the table saw a couple of times a day, but one does not use it very often. So the swing-up table saw provides the ability to pull a lever and swing the table saw down and out of the way unless needed. The saw 131 is pre-plugged in (pre-powered), and it has vacuum exhaust connected directly to it, which is running through the exhaust duct. In the trailer, the table saw is a large source of dust. By putting a vacuum to the saw which is connected, which is actually running through the fiberglass chamber 127 up into the area where there is a vacuum, air can be drawn out at the same time. The swinging table saw construction ensures that a saw is available when needed, but does not interfere with fabrication at other times.

When the fabrication station is used in a factory type setting, a swingable table saw is not needed. Instead, there is a separate table saw set up for use by all fabricators.

Another aspect of the present invention is the bench adjustment rod and bench slat that eliminates much of the structural steel in the trailer. The system shown in FIG. 5 and in detail in FIG. 13 requires only one steel track 102t that runs across the wall 102 horizontally, from the front of the vehicle to the back of the vehicle or from the front of one of the free-standing factory units to the other end to allow the adjustment of the channel support from side to side along the track. The sliding channel support portion is supported in the track.

A bench adjustment rod assembly 124a has one end slidably supported in a track 123t that is preferably attached to or provided in the front of the fiberglass chamber 123. The other end of the bench adjustment rod assembly 124a supports a sliding channel support portion 124b. The bench adjustment rod assembly 124a includes a turnbuckle construction, shown in FIG. 13, that allows fine adjustment. A significant advantage of this construction is that the bench slat system 124 is suitably flat at all times, unlike sawhorses in a factory. In a factory using saw horses and the like, one must rely on the saw horse being in good condition and the straight edges being straight. In contrast, with the present invention, both in a trailer and in a factory, the ability to adjust the levelness of the slat channel supports 124b using the bench adjustment rod assembly 124a ensures a flat support. The turn-buckle of the threaded rod 124a assembly allows all necessary adjustment and can be locked into position once alignment is set so that the top of those benches would be perfectly flat all the time, even though the slat support channels can slide longitudinally along the track 102t. The provision of a fabrication surface that is consistently flat is very important because if the counter top is formed crooked, it will be installed crooked.

Since the bench or fabrication surface should be flat all the time, the bench is mounted (through a track such as 102t) to the fabrication station support wall 102 or to the side wall 102 of the trailer. In this way, movement will not alter the relative position of the bench. The only thing that will alter the flatness of the bench is the deterioration of the removable slat portion 124c itself. The slat 124c, which is ordinarily made of sacrificed material, gets cut up and hacked up over time. The slat portion 124c may have to be removed, recut and replaced periodically. One may readjust the support portion 124a, 124b to accommodate the new slat 124c, if necessary.

When the fabrication station is used in a trailer, the track 102 is preferably bolted directly to the side of the vehicle. In a stand-alone fabrication station used in a factory setting, the track 102+ is secured to a support wall 102 of the unit itself so that the supports 124 do not rest upon the floor or its surroundings in any way. Thus, the relative flatness of the support is maintained by ensuring that the slat support channels lie on a plane.

Thus, the support system of the present invention provides a flat work surface regardless of the conditions of the surface that the trailer or fabrication station is resting on. A trailer may not be level, but the key is a perfectly true work surface. In a factory it really doesn't make any difference if the floor is level, so long as the top surface of all the slat portions 124c lie on a plane (within acceptable tolerances).

As shown in FIG. 5., the bench adjustment rod 124a is supporting a one piece slat support channel 124b that holds the sacrificial material, in the form of a slat 124c that pulls in and out.

Ordinarily, the slat portions 124c are made of sacrificed material, but the standard slat portions can also be removed and special slat portions can be inserted to accommodate different needs. For example, the particular slat portion 124c shown is 32 inches, but it can be removed and replaced with a 48 inch slat portion. In the trailer, the length of the slats might be limited to 48 inches, but outside a trailer, in a factory, for example, much bigger slats could be in. Much bigger supports could be put in with some temporary legs or some other type of reinforcing.

The slat channel support 124b itself always stays in the wall, but the channel portion 124b moves side-to-side. Thus, if the worker has a very small top piece it might be necessary to use two slats 124c very close together. On the other hand, it would be necessary to separate the slats 124c if a work piece includes an abnormally large bowl that hangs down between the slats.

The slat support channels 124b are adjusted, very simply by sliding along the track on the back wall. The threaded rod 124a will not need to be adjusted. Instead, the threaded rod, and turnbuckle type rod adjustment will just slide in the track 123t that is provided on or in the duct or chamber 123.

Another new feature on the fabrication station system is the use of other types of slats 124c that can be slipped in the support channels 124b to accommodate different needs. Examples are shown in FIGS. 14A–15A.

Figure 14A:
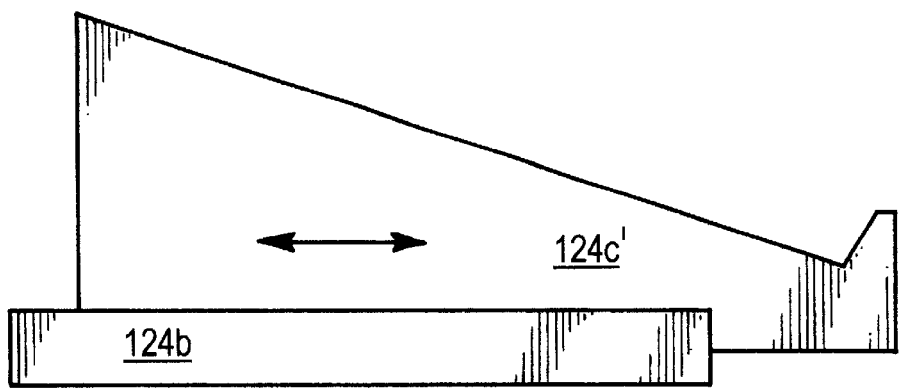
FIG. 14A is a side view of a modified removable slat portion that is angled.

FIG. 14A, for example, shows slats 124c' that are angled so as to support the workpiece at an angle to the fabricator so when we are working on a bowl or making vanities can be used. The system allows the user to pull out the parallel slat 124c and put in an angled slat 124c' that may be four inches in the front and 18 inches in the back. As shown, the angled slat 124c' may have a tongue to support the piece to be worked on. The use of angled slats also helps the exhaust vents work a little bit better.

So by using the channel for supporting what was called in the past sacrificial slats, it also gives you the possibility of having adjustable surface areas by putting in slats of different shapes and angles to support the different workpieces in an optimal fashion. The use of angled slats is advantageous in supporting the edging of material in a position that facilitates sanding. For example, backsplash and backsplash is normal three or four inches high.

Figure 15:
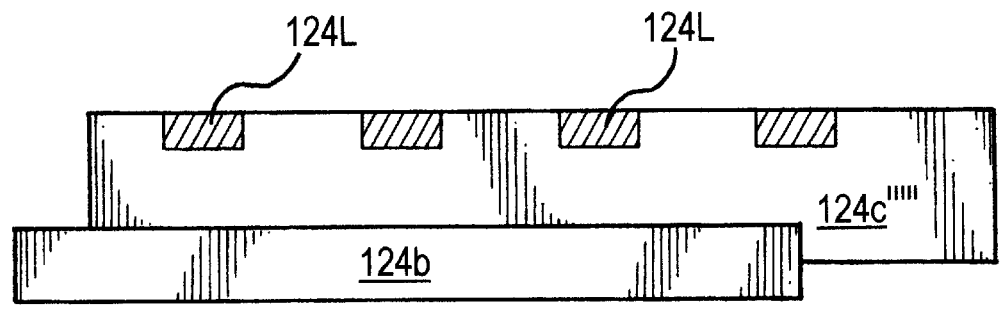
FIG. 15 is a side view of a modified removable slat portion that includes lateral slots for supporting longitudinally extending slats or work pieces.

As shown in FIG. 15, the present invention provides a grooved slat 124c'''' to support the backsplash; the fabricator can pull out our regular everyday sacrificial slat 124c and put in a slat that has grooves 124g cut into it. The backsplash fits right into to grooves and doesn't flip flop when you try to sand the edges of it.

Figure 14B:
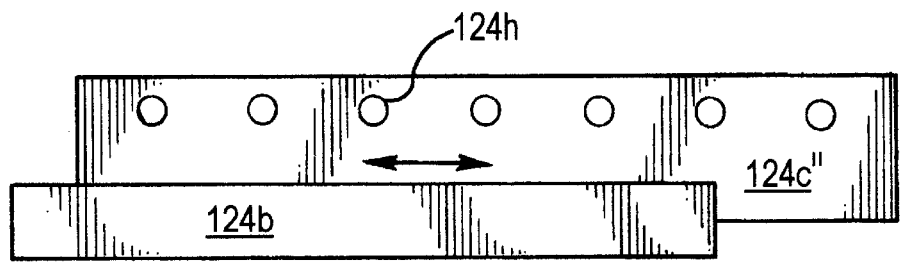
FIG. 14B is a side view of a modified removable slat portion that includes spaced holes.
Figure 14C:
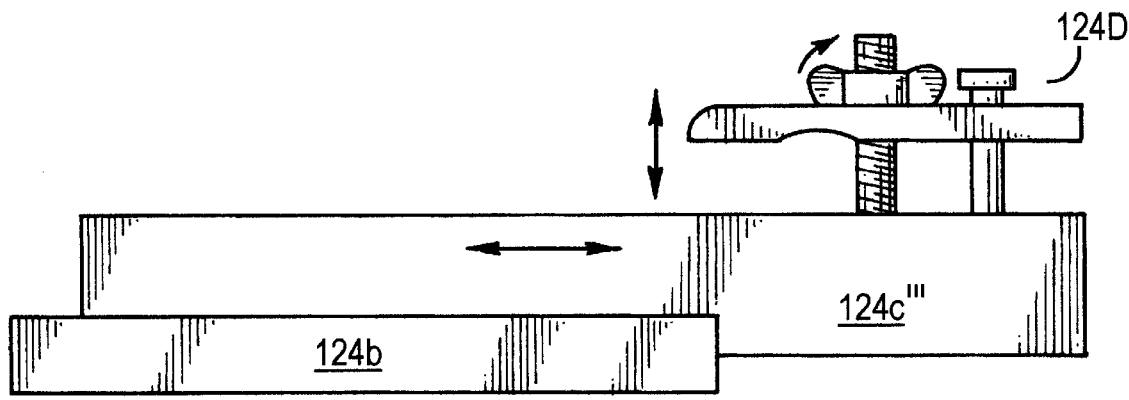
FIG. 14C is a side view of a modified removable slat portion that includes a clamp.
Figure 14D:
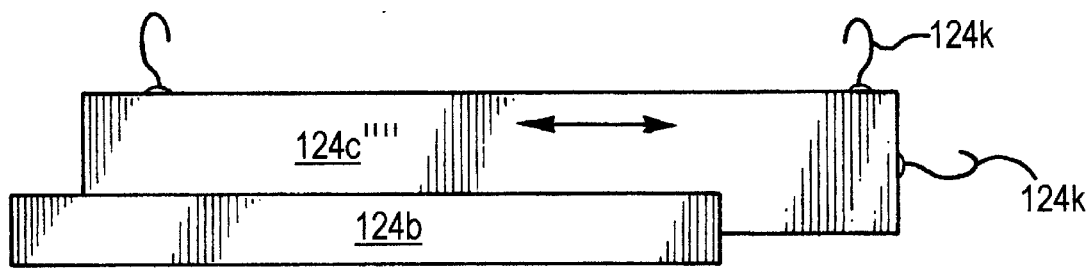
FIG. 14D is a side view of a modified removable slat portion that includes hooks.

Various other slat designs are possible. To begin with, angled slats work in some applications real well such as supporting backsplash for small counters. In addition, as shown in FIG. 14C, slats 124c''' that have their own clamping device 124D, on them can be provided. For example, one could put a sheet down and then hook the other side of the slat or to the slat itself and clamp the material. Another configuration, shown in FIG. 14B, provides a series of holes 124h running parallel to the top of the slat 124c'' to allow the user to hook something in the hole and lock the sheet down. Hooks 124k may also be provided as shown in FIG. 14D.

Figure 15A:
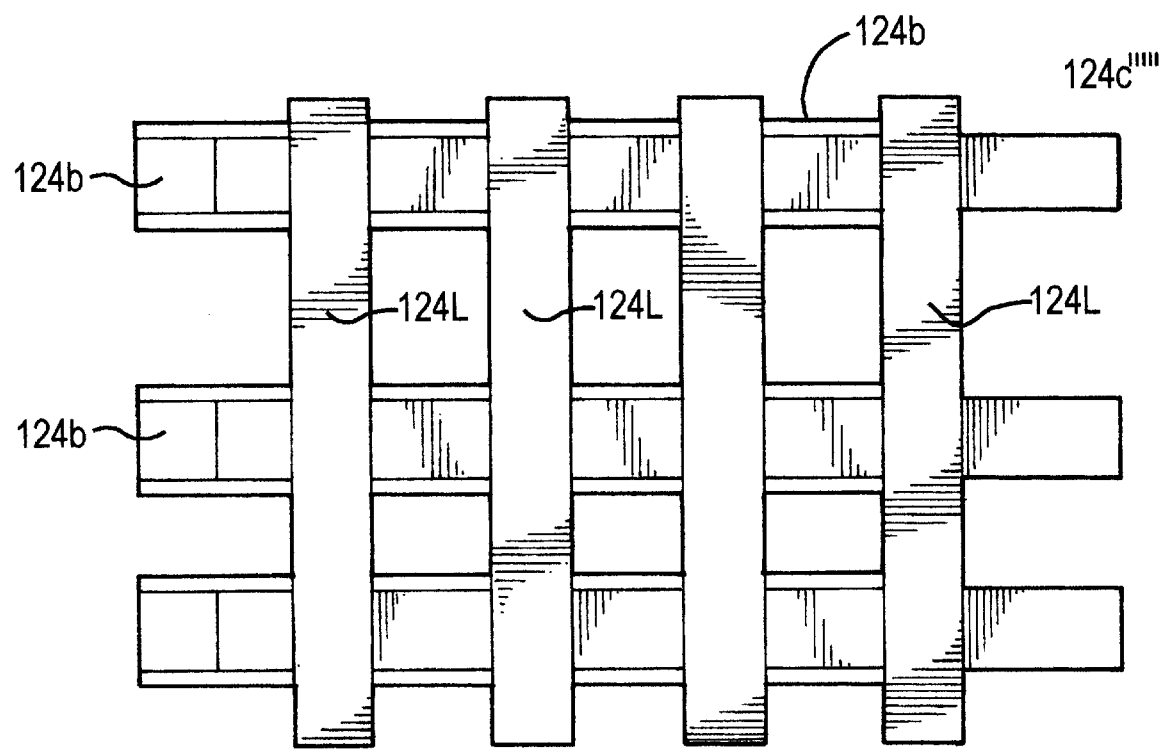
FIG. 15A is a top view of a three modified removable slat portions of the types shown in FIG. 15 supporting longitudinal slats.

The removable slat system offers myriad possibilities for support workpieces all with the assurance that the relative levelness in relation to the wall is consistent. As shown in FIGS. 15 and 15A, the slat system includes slats 124c'''' that can support slats 124L that extend longitudinally. The longitudinal slats can be used to reinforce the countertops as shown to provide a very rigid and straight surface that extends continuously from one end of the fabrication station or trailer, if desired. The slats 124L shown are flush with the lateral slats, but this is not necessary. The top of the slats 124L could be above or below the top of the lateral slats 124c'''' to accommodate different needs.

The slotted slats 124c'''' could also be used to support long thin work pieces such as windowsills or moldings. The grooves 124g could be shaped to support specific types or shapes of work pieces. This feature offers significant advantages in connection with fabrication jobs that involve atypical pieces. For example, a windowsill may be 8–12 inches deep and have to be nosed, even though it is thin and fragile unlike a 30 inch wide sheet or a 25 inch wide sheet. In consequence, the sill would sag in between some of these slats. One doesn't want to readjust, the location of all of the bench slats because they work well for everyday production. So instead, the longitudinal secondary slats 124L supported by notched slats 124c'''' are used. Longitudinal slats 124L can also be used with the lateral slats to create a "box" for supporting a sink bowl or similar piece.

Yet another important aspect of the present invention is the use of easy to use switches to control various components. The nature of the fabrication process, whether in a trailer or at a fabrication station in a factory, requires the fabricator to be consistently moving along the length of the trailer or fabrication station. The present inventor has recognized that there are tremendous opportunities for improved efficiency if the fabricators can avoid the hassle of moving along the length of the trailer or fabrication station every time one of the components has to be switched on or off. Thus, to facilitate the fabrication process, the present invention preferably includes remote switching capability for the most commonly switched components.

The heat supply units 123 are, for example, connected to switches 123s that may be operated on timers. Thus, a fabricator working at the most forward end of the vehicle should be able to reach up and switch on a timer and put 15 minutes of heat on a workpiece at a time and then walk away and do something else and that heat supply unit 123 under the bowl will blow its warm air out on that sheet for 15 minutes. Timers are useful in the context of heat supply units, since the rate of drying is predictable, so that the timers can be set to blow just long enough to dry the adhesive. Should the fabricator find out that that the particular workpiece that was just made isn't quite dry yet, he can give it another 10 minutes on the heat supply units. The fabrication station 117 provides the option to either continue to bathe the workpiece in warm air or if the piece is dry already, to just reach up and turn the heat off and then start sanding it, putting it and so on and so forth. In this way, control of discrete heat sources is right at the fabricator's fingertips.

For components whose frequency and duration of use is less predictable, other forms of remote switching are preferable. In accordance with the present invention, the fabrication station of the present invention uses photoelectric cells 142 to control switches. As shown, in FIGS. 5 and 6, the photoelectric cells 142 may be provided as far away as opposite ends of the station or as near as opposite ends of a vent to be controlled. Known photoelectric switch technology can be used on opposite sides of a vent so that a beam passes directly across the exhaust vent grill. A fabricator standing at the bench can touch the grill, the beam will be interrupted and trigger a surface to turn the vents on. If the fabricator is down on the other end of the vehicle and decides that he does not want that vent on or that the vent is not necessary, he can simply pass his hand across that beam to shut that vent off. A very easy way to turn on and off which is important when one is in the midst of the fabrication process.

The photoelectric switch 142 can be used anywhere in the fabrication station, whether in a trailer or in a factory vehicle. The same applies to the intakes over the fabricator's head (which are preferably operated in groups of four). There will be a beam location above, an inconspicuous beam location so that the fabricator has to put my hand there to trigger air intakes on and air intakes off.

The photoelectric cells 142 are particularly useful in an elongated fabrication station or trailer environment where the user may be 12 or more feet from a switch located, but able to switch a vent (intake or exhaust) on or off with a wave of a hand. The photo cells are preferably used on all of the vents except for the heat supply units, which are operating on timer switches, as mentioned before. An alternative remote switch to photoelectric cells 142 is cables, but they are awkward.

As explained above, innovations such as discrete area heat supply units 123 and replaceable slats 124*c* are useful in a variety of fabrication environments and are not limited to a trailer, for example. Thus, in accordance with another aspect of the present invention, the fabrication stations may be designed a stand-alone units for use in a factory or shop setting. Examples of such stand-alone fabrication stations 117 will now be described in connection with FIGS. 9–12. These examples are exemplary and not limiting. Those skilled in the art will appreciate that, in most instances, the features described in the context of a mobile trailer are applicable to a stand-alone unit and vice versa. Indeed, "stand-alone" units may be mounted on a mobile platform to provide a mobile fabrication station. The suitability and practicality of each of these features depends on the fabricator's particular needs.

In the embodiments shown in FIGS. 9–12, the stand alone fabrication station 117 is a 12 foot long unit that includes a horizontal base 110 and a vertical wall 102 extending upward from the base. When a central vacuum source is available, a blast gate 110BG is preferably provided in the base to provide a convenient way of removing dust that falls to the floor. If desired, conventional leveling devices 110L can be provided on the base or the base 110 can be flat. Each fabrication station 117 has a 12 foot long work surface provided by solid surface material supports 124 spaced along the length of the unit. The fabrication station also includes a 12 foot long heat supply plenum or chamber 223, a 12 foot long exhaust (air removal) plenum or chamber 227 with spaced exhaust vents, lighting, shelving, power tool shelving and a 12 foot long heating and ventilation air intake plenum or chamber 229. As explained previously in connection with the trailer embodiment, providing a 12 foot fabrication workbench unit with spaced heat supply units allows fabricators to perform vastly different tasks on a work piece at the same time. Again, a benefit of having discrete surface heat supply units on the fabrication table is that the users can do multiple steps at one time.

The details of the supports (124*a*–124*c*), vents, switches, lights and shelves can be the same as in the trailer embodiments as described above. Again, the ability to precisely control the environment in a discrete area of the work surface that does not necessarily require an enclosed environment because it is not necessary to change the temperature throughout the room. The fabricator is just working on spots so that quite often the real key is to have the ability to heat discrete areas of the product.

Although the innovations described above in the context of trailers are applicable to stand-alone fabrication stations, the design of stand-alone fabrication stations is not constrained by the space limitations inherent in designing a fabrication station for use within a trailer. For this reason, different configuration might be advantageous in a factory. For instance, in some environments, it is not necessary to have a wall devoted to storage (which is the case in the trailer), although the right hand wall is convenient to place one's tools on, place supplies and one's mixing the seam kits and so on. In a factory setting, for example you could provide storage and the like, by elongating the work unit. A 12-foot work unit could be extended to 16 feet with a four-foot area at the end that would give you a work surface and storage area.

Figure 9:
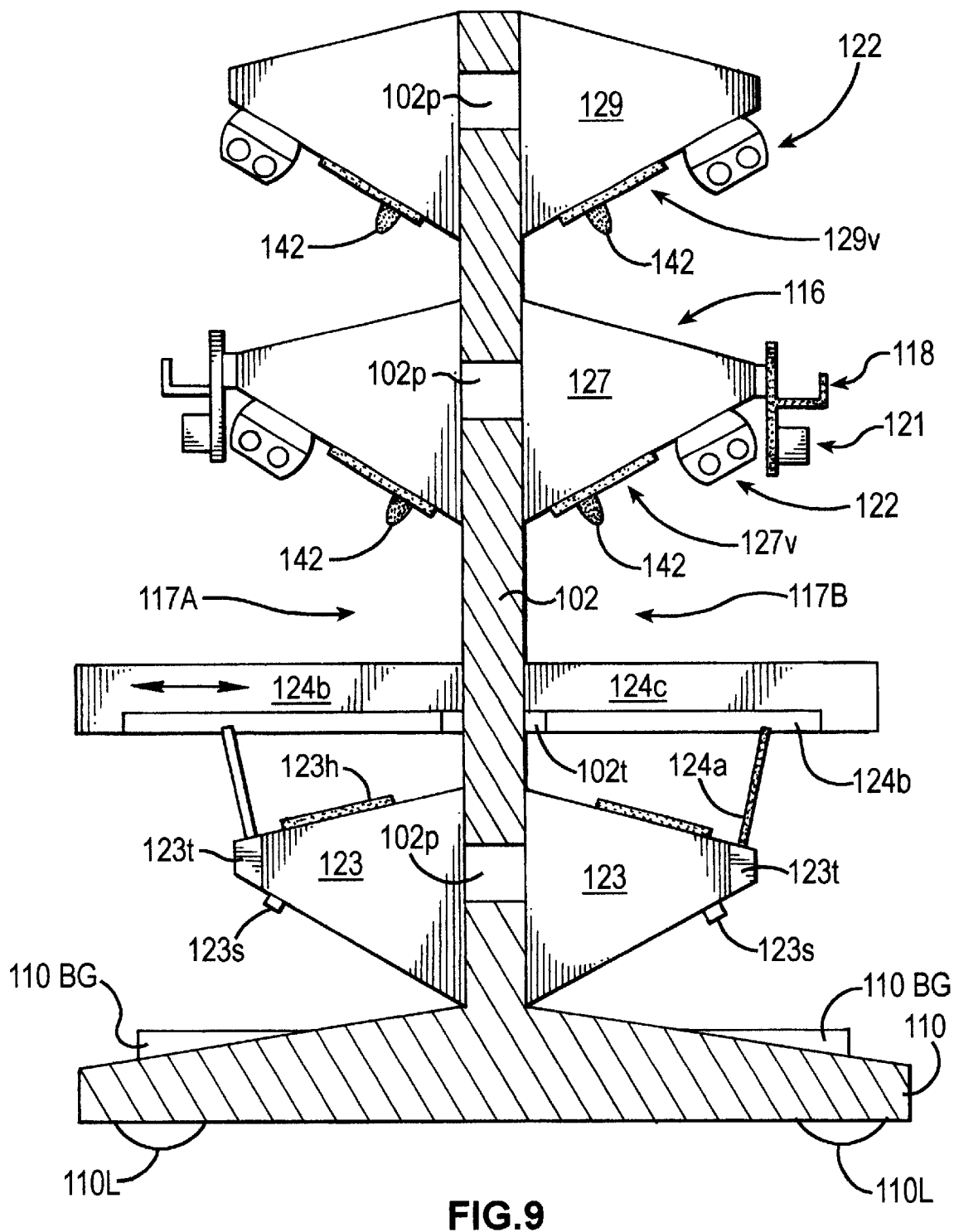
FIG. 9 is a sectional view of a dual fabrication station unit according to the present invention.
Figure 10:
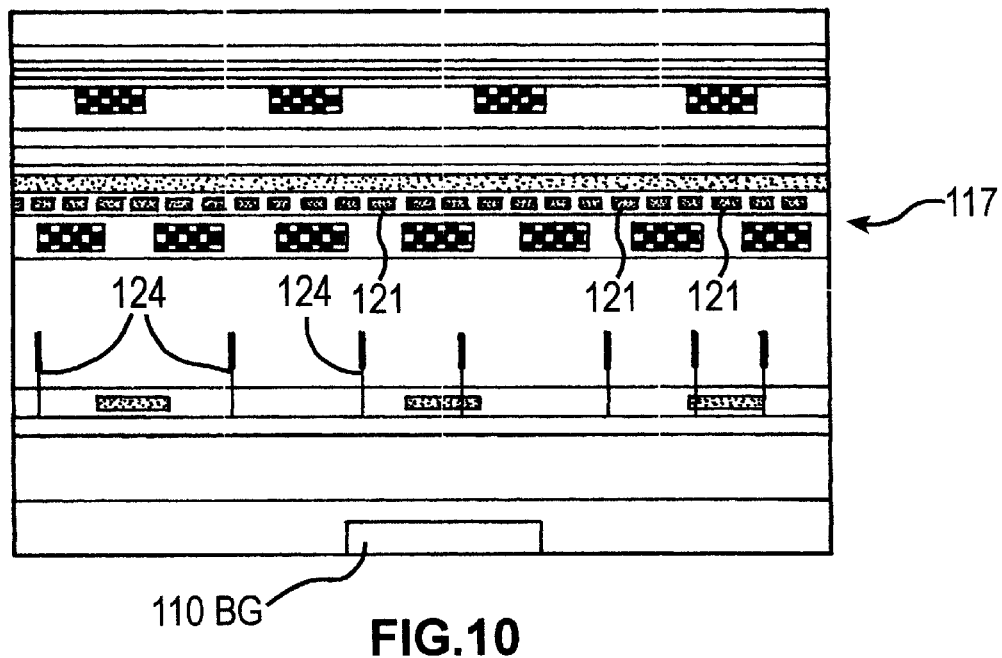
FIG. 10 is a plan view of one side of the dual fabrication station unit of FIG. 9.
Figure 12:
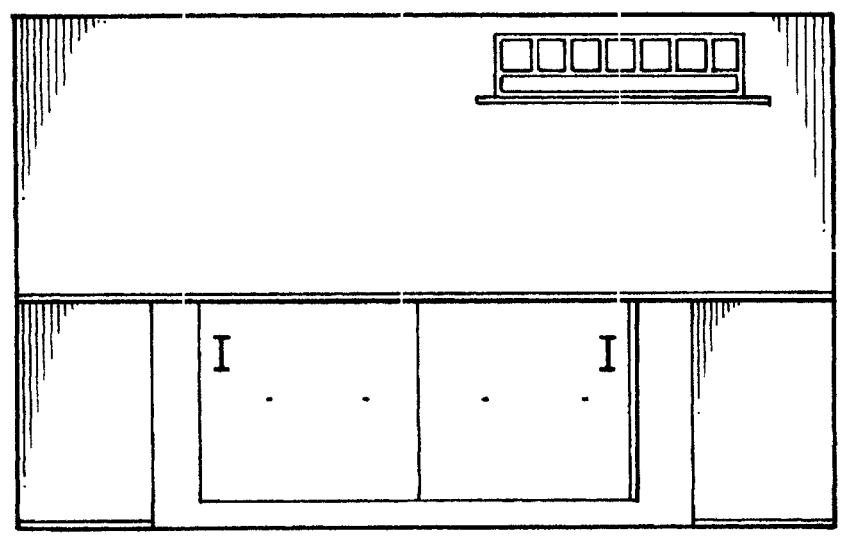
FIG. 12 is a plan view of one side of the fabrication station unit of FIG. 11.
Figure 11:
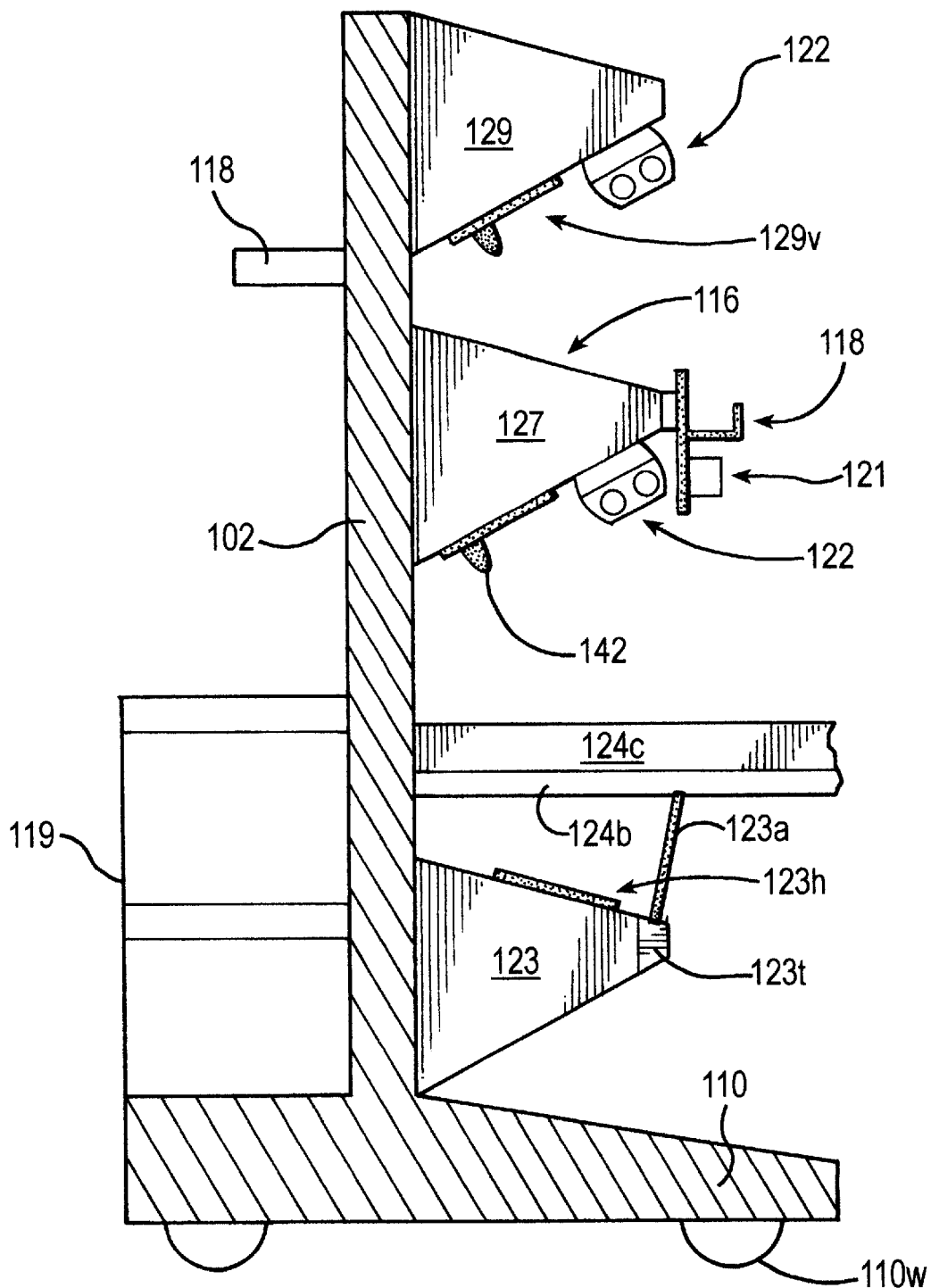
FIG. 11 is a sectional view of another fabrication station unit according to the present invention.

In a factory or shop setting one might have back-to-back fabrication stations on opposite sides of one another, as shown in FIGS. 9 and 10. In this example, it might be desirable to extend the station beyond 12 feet in length to allow for storage so that you would have basically one wall 102 with two stations 117A and 117B each of which that had everything the fabricator needed to fabricate a piece of solid sheet material. An alternative, shown in FIGS. 10, 11 and 12 is to have a fabrication station 117 on one side of the wall 102 and storage on the opposite side.

Figure 9A:
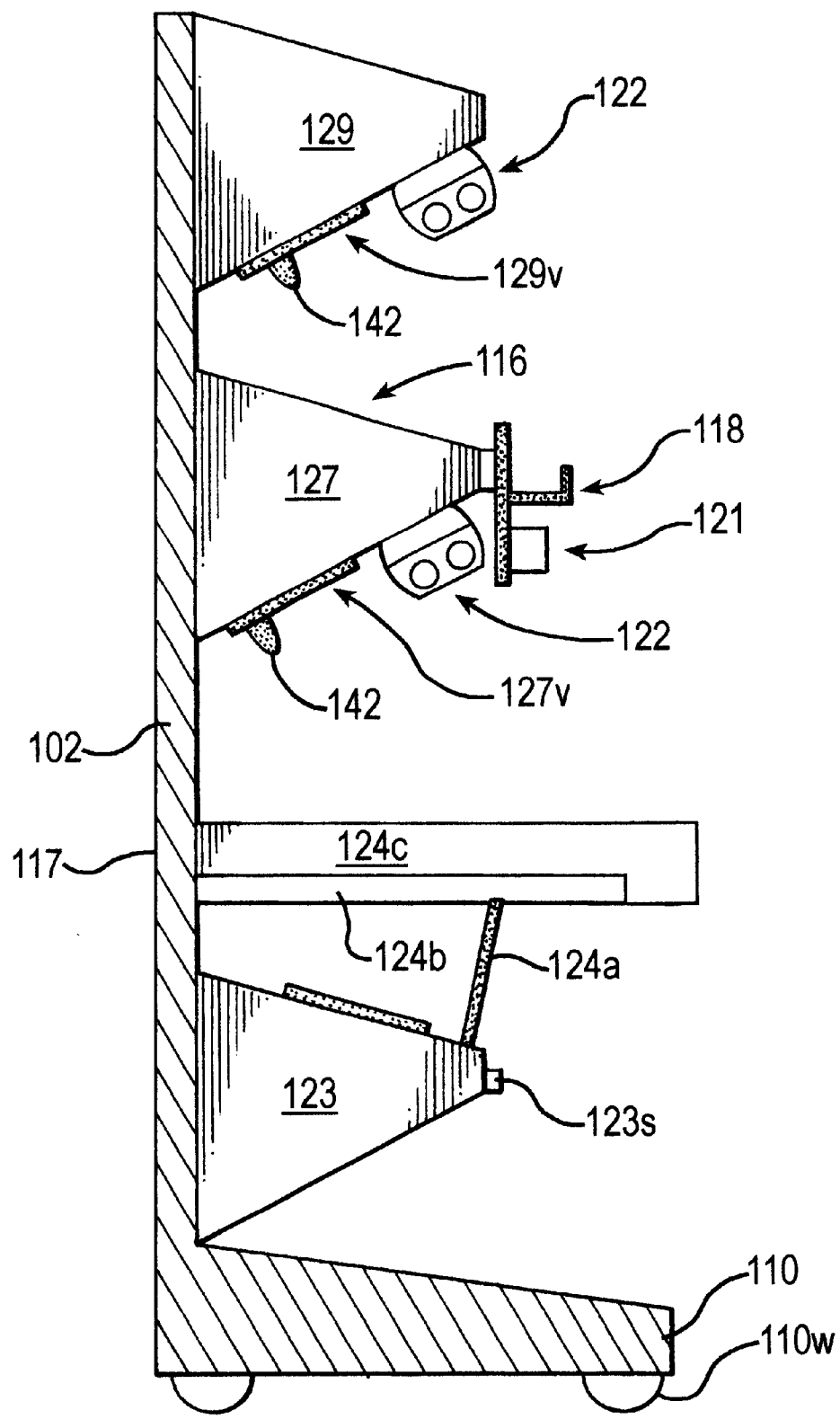
FIG. 9A is a sectional view of a fabrication station unit module according to the present invention.
Figure 9B:
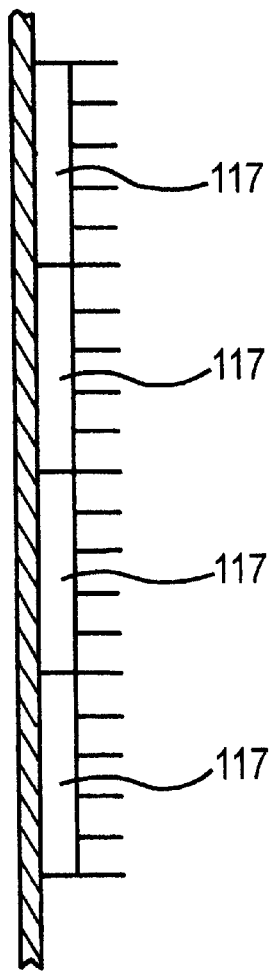
FIGS. 9B–D schematically illustrate different configurations of four fabrication station unit modules of the type shown in FIG. 9A in accordance with the present invention.
Figure 9C:
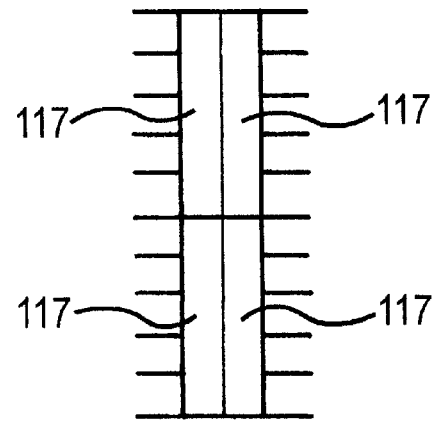
Figure 9D:
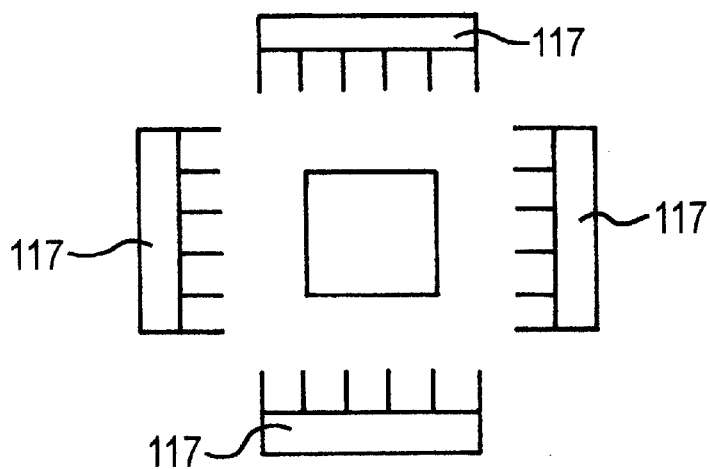

The fabrication stations 117 can also be constructed as fabrication station modules that have a flat back as shown in FIG. 9A so that the fabrication stations 117 can be arranged in variety of configurations such as those shown in FIGS. 9B–D from back-to-back (FIG. 9C) to along an interior or exterior wall (FIG. 9B) to "cubicle" arrangement (FIG. 9D) around a table or worksurface. The fabrication stations 117 could be provided with wheels 110W to facilitate relocation.

Even greater productivity is possible with configurations such as those shown in FIGS. 9C–D. For example, the fabricator could work on a 12 foot sheet, and turn right around and work on another sheet while that first sheet is drying. The user can go back and forth from one surface to the other. There should also be some provision to have a flat surface somewhere that either could be a flat surface that is placed on top of my bench flat system when there is no solid surface counter top or something that is on the end of this fabrication unit.

Having back to back work areas like this also provides efficiencies in terms of heat supply, air intake and things like that. With regard to heat, there could be a common source of heat that could be directed to either side of a combined machine. One possibility, shown in FIG. 9, is to provide passages 102*p* that allow communication between the plenums on opposite sides of the wall 102. A common plenum or chamber could also be used. As for air intake, it is possible to have a common intake which might be more powerful to serve both sides of the dual sided fabrication table at once or passages 102*p* could be provided. The air intake could thus be directed to either side (or both sides) of the dual work unit machine.

With regard to exhaust, fabrication facilities often have vacuum systems in them for other purposes so a vacuum source is ordinarily available. Thus, the exhaust plenum or plenums 127 may connected to a central vacuum source. The vacuum systems in most shops are connected to some of the bigger equipment, big table saws, big panel saws, banding equipment, roofing equipment, the big machines that produce a lot of saw dust. As noted above, a blast gate 110BG can be provided in the base 110 of the fabrication station 117 so that suction can be supplied to selectively collect dust that falls to the floor. Few shops have small connections to be able to connect to sanders, for example, it is too cumbersome, too difficult to sand when one is pulling a hose and a wire, so vacuums are ordinarily not used for finishing equipment except in the context of down draft tables.

A down draft table has a more or less fixed location. As a consequence, pieces must be moved to the table to be worked on. In contrast, with the system of the present invention, the product never has to be moved after it is placed on the fabrication station. The product is cut to rough size on the bench—it is nosed on the bench, it is flipped back over on the bench and is routed on the bench, and it is sanded on the bench. In the system of the present invention, there is no down draft type of system, instead, air is pulled off the surface of the work area through the exhaust vents. While dust might fall to the floor, the air the user is breathing in the small tasks, the hand sanding tasks, ventilation air is coming in over the user's head right towards you face, right toward the user's breathing area, that is actually helping to make up some of the air that the exhaust vent system is removing. Thus, an important aspect of the present invention is the provision of ventilation air intake and dust ridden air exhaust vents arranged along the fabrication table so as to create a circulation air barrier between the fabricator's face and the surface of solid sheet material that is being worked on.

So, from a fabricator or an employee or worker's vantage point, ventilation air is brought in over the user's head to replace the air that is being drawn off the counter top near the fabricator's hands and waistline.

At the same time that the heat is coming from underneath the sheet to warm that sheet to expedite it's drying. So the user gets the benefit of a high degree of different climate control—the benefits of everything that one needs to fabricate without ever having to move the work piece.

In a factory setting, the fabrication stations would preferably include a heat supply 123, an exhaust vent 127 that might be connected into the vacuum supply of the factory and an intake valve 129 that provides ventilation air. The ventilation air may be either brought in from outside or just brought in from above the unit. It doesn't have to be outside air it just has to be free air. This aspect of the design of fabrication stations will be driven to a large extent by ambient climate. A fabricator in Maine will probably use air from inside the building during the winter. A fabricator in Dallas, Tex., may use outside during the winter.

In addition a variety of heat sources can be used in a factory setting. For example, heat for the work surface heat supply heat exchangers could be piped in from a hot water boiler somewhere in or near the factory somewhere. Most fabrication factories have the circulating hot water heater system because open flames are not acceptable.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. For example, the features described in connection with FIGS. 12–15A are selectively applicable to any of the trailer or stand-alone fabrication stations described herein. The scope of the invention is to be defined only by the claims appended hereto, and by their equivalents. Thus, while the present, invention has been described with respect to what are believed to be the most practical embodiments thereof, it is particularly noted that this is by way of example only, and appropriate modifications and variations thereof are possible within the spirit and scope of the claims appended hereto.

What is claimed is:

1. A solid surface material fabrication station for fabricating a solid surface material, the fabrication station comprising:
    a support wall;
    a plurality of spaced-apart supports that extend from the support wall and define a solid surface support for supporting the solid surface material to be fabricated such that the solid surface material to be fabricated extends at least across two of the supports so as to define a region beneath the solid surface to be fabricated extending from the floor to the solid surface material to be fabricated and a region above the solid surface material to be fabricated corresponding to a region where a worker's face will ordinarily be while working on the solid surface material to be fabricated;
    a plurality of spaced heat supply units located below the solid surface support, each of the heat supply units being positioned so as to selectively heat a portion of the surface of the solid surface material to be fabricated, and the heat supply units being switchable on and off independently of other heat supply units;
    an air exhaust chamber connected to a source of air suction and a plurality of air exhaust vents spaced along the length of the fabrication station for drawing air from the vicinity of the solid surface material being fabricated into the air exhaust chamber, the air exhaust vents being located above, but near the surface of the solid surface material to be fabricated;
    a ventilation air intake chamber and a plurality air intake vents located above the air intake vents for discharging ventilation air from the ventilation air intake chamber;
    wherein the air intake vents are located relative to the exhaust vents so as to create a circulating air barrier between the face of a fabricator working on the solid surface material to be fabricated and the surface of the solid surface material to be fabricated.

2. The fabrication station of claim 1, further comprising a track secured to the support wall; and
    wherein the plurality of spaced-apart supports comprise a plurality of supports that are slidably mounted within the track along the support wall, each of the supports comprising a slat support channel portion having one end slidably received within the track and a removable slat portion that is supported by the slat support channel portion but is extensibly movable toward and away from the support wall relative to the slat support channel portion.

3. The fabrication station of claim 2, further comprising an adjustable support that supports each slat support channel portion so that the position of the slat support channel portions is adjustable relative to the support wall and one another to provide a fine adjustment.

4. The fabrication station of claim 2, further comprising removable slat portions of different sizes and shapes that can be supported within the slat support channel portion so that the supports are adjustable to accommodate different shapes of solid surface material to fabricated.

5. The fabrication station of claim 4, wherein the removable slat portion has an angled upper surface.

6. The fabrication station of claim 4, wherein the removable slat portion includes a plurality of spaced holes.

7. The fabrication station of claim 4, wherein the removable slat portion includes a clamp.

8. The fabrication station of claim 4, wherein the removable slat portion includes a hook.

9. The fabrication station of claim 4, wherein the removable slat portion includes a longitudinal groove.

10. The fabrication station of claim 9, wherein the removable slat portion supports a longitudinal slat within the longitudinal groove.

11. The fabrication station according to claim 2, wherein the removable slat portion of the supports is made from a sacrificial material such that at least a portion of the solid surface material to be fabricated is supported on a support that can be cut with solid surface fabricating tools during the fabrication process without damaging the tools.

12. The fabrication station of claim 1, further comprising a base from which the support wall extend and wheels connected to the base to allow the base to roll.

13. The fabrication station of claim 1, further comprising a plurality of spaced-apart supports that extend from the support wall on each side of the support wall so as to provide fabrication stations on both sides of the support wall.

14. The fabrication station of claim 13, wherein the fabrication stations on each side of the support wall include a plurality of spaced heat supply units located below the solid surface support; an air exhaust chamber connected to a source of air suction; and ventilation air intake chamber.

15. The fabrication station of claim 14, wherein the air exhaust chambers communicate with one another and the ventilation air intake chambers communicate with one another.

16. The fabrication station of claim 1, further comprising a table saw mounted on a support that can be swung from a substantially horizontal position to a storage position.

17. The fabrication station of claim 1, wherein the air exhaust chambers comprise a plenum secured to the support wall.

18. The fabrication station of claim 17, further comprising utility connections prewired into the air exhaust plenum prior to attachment to the support wall.

19. The fabrication station of claim 1, wherein the air intake chambers comprise a plenum secured to the support wall.

20. The fabrication station of claim 1, wherein the heat supply chambers comprise a plenum secured to the support wall.

21. The fabrication station of claim 1, further comprising a timer switch for switching the heat supply units on and off independently of other heat supply units.

22. The fabrication station of claim 1, further comprising a photoelectric switch for selectively opening and closing the exhaust vents.

23. A solid surface material fabrication station for fabricating a solid surface material, the fabrication station comprising:

a support wall;
a plurality of spaced-apart supports that extend from the support wall and define a solid surface support for supporting the solid surface material to be fabricated such that the solid surface material to be fabricated extends at least across two of the supports so as to define a region beneath the solid surface to be fabricated extending from the floor to the solid surface material to be fabricated and a region above the solid surface material to be fabricated corresponding to a region where a worker's face will ordinarily be while working on the solid surface material to be fabricated;
a track secured to the support wall, wherein the plurality of spaced-apart supports comprise a plurality of supports that are slidably mounted within the track along the support wall, each of the supports comprising a slat support channel portion having one end slidably received within the track and a removable slat portion that is supported by the slat support channel portion but is extensibly movable toward and away from the support wall relative to the slat support channel portion; and
a plurality of spaced heat supply units located below the solid surface support, each of the heat supply units being positioned so as to selectively heat a portion of the surface of the solid surface material to be fabricated, and the heat supply units being switchable on and off independently of other heat supply units.

24. The fabrication station of claim 23, further comprising an air exhaust chamber connected to a source of air suction and a plurality of air exhaust vents spaced along the length of the fabrication station for drawing air from the vicinity of the solid surface material being fabricated into the air exhaust chamber, the air exhaust vents being located above, but near the surface of the solid surface material to be fabricated.

25. The fabrication station of claim 24, wherein the air exhaust chambers comprise a plenum secured to the support wall.

26. The fabrication station of claim 25, further comprising utility connections prewired into the air exhaust plenum prior to attachment to the support wall.

27. The fabrication station of claim 24, further comprising a photoelectric switch for selectively opening and closing the exhaust vents.

28. The fabrication station of claim 23, further comprising a ventilation air intake chamber and a plurality air intake vents located above the air intake vents for discharging ventilation air from the ventilation air intake chamber; and wherein the air intake vents are located relative to the exhaust vents so as to create a circulating air barrier between the face of a fabricator working on the solid surface material to be fabricated and the surface of the solid surface material to be fabricated.

29. The fabrication station of claim 23, further comprising an adjustable support that supports each slat support channel portion so that the position of the slat support channel portions is adjustable relative to the support wall and one another to provide a fine adjustment.

30. The fabrication station of claim 23, further comprising removable slat portions of different sizes and shapes that can be supported within the slat support channel portion so that the supports are adjustable to accommodate different shapes of solid surface material to fabricated.

31. The fabrication station of claim 30, wherein the removable slat portion has an angled upper surface.

32. The fabrication station of claim 30, wherein the removable slat portion includes a plurality of spaced holes.

33. The fabrication station of claim 30, wherein the removable slat portion includes a clamp.

34. The fabrication station of claim 30, wherein the removable slat portion includes a hook.

35. The fabrication station of claim 30, wherein the removable slat portion includes a longitudinal groove.

36. The fabrication station of claim 35, wherein the removable slat portion supports a longitudinal slat within the longitudinal groove.

37. The fabrication station according to claim 30, wherein the removable slat portion of the supports is made from a sacrificial material such that at least a portion of the solid surface material to be fabricated is supported on a support that can be cut with solid surface fabricating tools during the fabrication process without damaging the tools.

38. The fabrication station of claim 23, further comprising a base from which the support wall extends and wheels connected to the base to allow the base to roll.

39. The fabrication station of claim 23, further comprising a plurality of spaced-apart supports that extend from the support wall on each side of the support wall so as to provide fabrication stations on both sides of the support wall.

40. The fabrication station of claim 39, wherein the fabrication stations on each side of the support wall include a plurality of spaced heat supply units located below the solid surface support; an air exhaust chamber connected to a source of air suction; and ventilation air intake chamber.

41. The fabrication station of claim 40, wherein the air exhaust chambers communicate with one another and the ventilation air intake chambers communicate with one another.

42. The fabrication station of claim 23, further comprising a table saw mounted on a support that can be swung from a substantially horizontal position to a storage position.

43. The fabrication station of claim 23, further comprising a timer switch for switching the heat supply units on and off independently of other heat supply units.

\* \* \* \* \*